US012774740B2

(12) United States Patent
Czajkowski

(10) Patent No.: US 12,774,740 B2
(45) Date of Patent: Oct. 27, 2026

(54) APPARATUS FOR MOUNTING A FRONT DIFFERENTIAL TO A VEHICLE CHASSIS

(71) Applicant: Marlin Crawler, Inc., Fresno, CA (US)

(72) Inventor: Michael Czajkowski, Fresno, CA (US)

(73) Assignee: Marlin Crawler, Inc., Fresno, CA (US)

( * ) Notice: Subject to any disclaimer, the term of this patent is extended or adjusted under 35 U.S.C. 154(b) by 1169 days.

(21) Appl. No.: 17/586,694

(22) Filed: Jan. 27, 2022

(65) Prior Publication Data

US 2023/0234437 A1 Jul. 27, 2023

(51) Int. Cl.

*B60B 35/16* (2006.01)
*B62D 21/15* (2006.01)
*F16H 57/025* (2012.01)

(52) U.S. Cl.

CPC ......... *F16H 57/025* (2013.01); *B60B 35/163* (2013.01); *B62D 21/155* (2013.01)

(58) Field of Classification Search

CPC .... B60K 17/16; B60B 35/163; B62D 21/155; B62D 65/026; B62D 65/10; F16H 57/037; F16H 57/025

See application file for complete search history.

(56) References Cited

U.S. PATENT DOCUMENTS 5,884,723 A * 3/1999 Kleinschmit ............. F16F 1/38 180/378
7,360,622 B2 * 4/2008 Lee ........................ B60K 17/16 180/291
8,657,060 B2 2/2014 Ohno et al.
8,794,370 B2 * 8/2014 Hiramatsu ........... B62D 25/082 180/274
9,085,234 B2 * 7/2015 Saneyoshi .............. B62D 21/11
2020/0001707 A1 1/2020 Coffman

FOREIGN PATENT DOCUMENTS

JP 2007198443 8/2007

OTHER PUBLICATIONS

English Abstract of JP200719843A retrieved on Jan. 31, 2022 from: "https://worldwide.espacenet.com/patent/search/family/038453239/publication/JP2007198443A?q=pn%3DJP2007198443A".
Toyota_Tacoma_2015_2018_Front_Differential_Service_Manual_Components, retrieved on Feb. 1, 2022, "https://www.tguide.net/components-1327.html".

* cited by examiner

*Primary Examiner* — Jason D Shanske
*Assistant Examiner* — Joselynn Y Sliteris
(74) *Attorney, Agent, or Firm* — Sierra IP Law, PC; Mark D. Miller

(57) ABSTRACT

The present invention provides methods and apparatus for mounting a front differential to the frame of a vehicle that has been equipped with off road components to achieve proper alignment without decreasing ground clearance. The apparatus may include first and second support brackets having bushings that directly engage the differential thereby eliminating bulky spacers that otherwise decrease ground clearance.

20 Claims, 21 Drawing Sheets

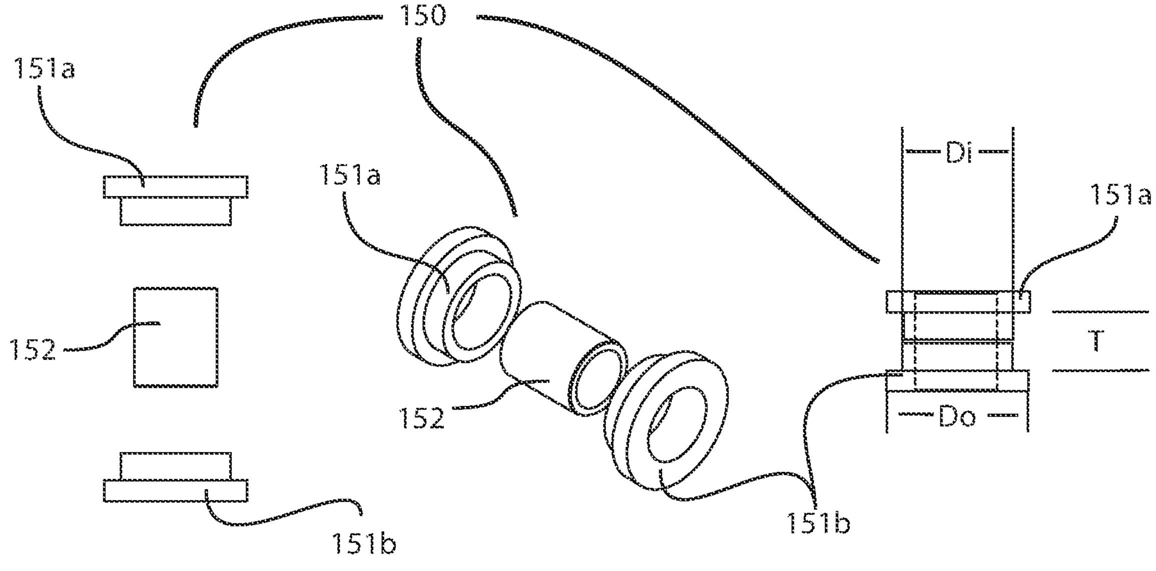
FIG. 20A
FIG. 20B
FIG. 20C
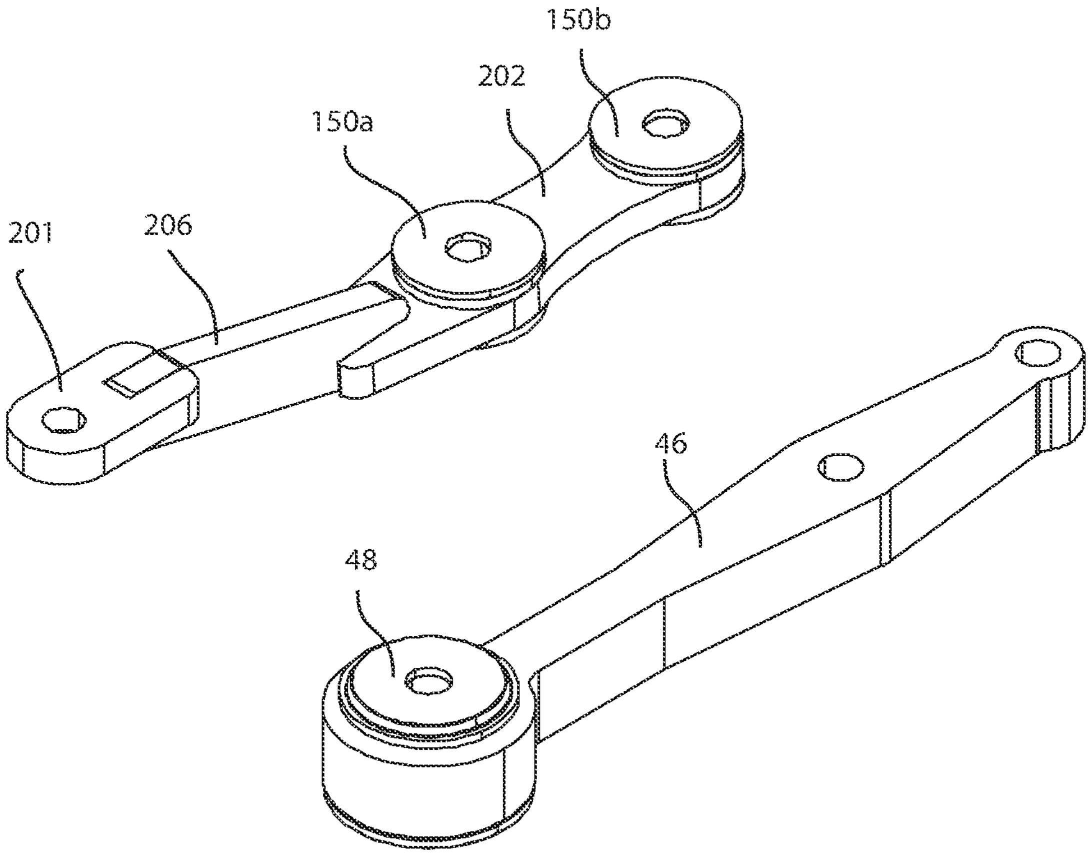
FIG. 21

APPARATUS FOR MOUNTING A FRONT DIFFERENTIAL TO A VEHICLE CHASSIS

FIELD OF THE INVENTION

The present invention relates to vehicle differentials, and more particularly to methods and apparatus for mounting a front differential to the frame of a vehicle that has been equipped with off road components to achieve proper alignment without decreasing ground clearance.

BACKGROUND OF THE INVENTION

A vehicle differential is a critical drivetrain component that transfers torque from a gearbox to the axles and subsequently to the wheels of a vehicle. Off-road vehicles are typically configured with four-wheel drive (e.g., 4×4) using a system having a front differential and a rear differential both of which are connected to a transfer case (e.g., gearbox or transmission). Consumer "light trucks" with a factory independent front suspension (IFS) are typically modified using aftermarket components such as lift kits, larger tires, and in some situations lengthening of the axles and driveline, all of which enable drivability over various terrain, thereby classifying the truck as an off-road vehicle or modified truck. Some modified trucks are specially modified for competitive rock crawling where drivers navigating over rock piles, large boulders, hills, trails, and other similar landscapes, hence the name "rock crawling." Because the modified trucks drive over such uneven terrain, the vehicle's tires may slip causing the chassis or differential to bottom out onto the terrain below, resulting in damage to the vehicle's underside. Therefore, skid plates are frequently affixed to the vehicle's underside to protect the engine, gearbox, and drivetrain components.

A skid plate is an under vehicle component typically comprised of a durable dent-resistant material (e.g., steel or aluminum) that provides protection to sensitive or otherwise vulnerable vehicle parts and equipment from ground objects passing underneath. As such, a skid plate is typically the lowest frame-mounted item on a vehicle and determines the maximum size limitation of an object that is able to pass under the vehicle without contact. A front skid plate protects the front frame cross member and subframe cross members comprising the frame attachment points for the IFS assembly (e.g., lower control arms and differential assemblies in four wheel drive applications). Additionally, a front skid plate prevents dislodged debris or objects that are moved, bounced, or reflected off the ground or the vehicle itself from traveling up into critical operating components such as the engine drive belt and fan assembly, oil pan and filter, radiator, electronics, wiring and wiring harnesses, and high pressure hoses used to transport water, oil, power steering and automatic transmission fluids.

IFS allows each wheel to move vertically within the wheel fender (e.g., wheel well) such that the wheels are unconstrained from the other wheels in the drivetrain. IFS also allows the suspension components to mount to various locations on the chassis. The front differential housing (e.g., casing) connects to the chassis either with a subframe or a mounting arm therebetween, and the spindle of the pinion gear connect to the transfer case. The drivetrain of a light truck from the factory or from an original equipment manufacturer (OEM) is generally designed for comfort under common driving conditions, not off road use. In such vehicles, the differential housing is mounted to the chassis with a pair of arms, and bushings are provided between each of the arms and the chassis to dampen vibrations produced from the road. However, when a light truck is modified for rock crawling, the factory or OEM suspension and drive train may be swapped out for aftermarket components suited to the vehicle's new application. To increase the vehicle's ground clearance for rock crawling, the factory or OEM dampeners (e.g., struts), springs, control arms, wheels, and tires may be replaced with aftermarket components.

However, with an increase in clearance a new problem is introduced. The problem concerns the alignment of the drivetrain: when the described lifting components are integrated into the vehicle, the drivetrain geometry is misaligned. Drivetrain misalignment includes the drive shaft angles, axle shaft angles, which causes wear to the U-joints, seals (e.g., boots), axle strain, and bearing wear on the differential or transfer case. As a corrective measure, to cure drivetrain misalignment, spacers are placed between the differential's mounting components and the frame, typically between at the ends of the two support arms between the bushings and the chassis/frame. The spacers increase the distance of the differential from the chassis which lowers the center of gravity and aligns the front drivetrain close to or near the factory configuration, solving the misalignment problem. However, although the spacers realign the drivetrain geometry, they decrease the ground clearance at the ends of the arms, at the interface between the differential mounting arms and the frame. As a result, using spacers to realign a vehicle's drivetrain provides a contradictory solution to increasing vehicle ground clearance. Although the differential mounting arm and frame interface is at or near the apex of ground interference, in competitive rock crawling every inch of clearance counts. It is therefore desirable to provide methods and apparatus for aligning the differential and drive chain of a vehicle that has been equipped for off road use without decreasing critical ground clearance.

SUMMARY OF THE INVENTION

The present invention provides methods and apparatus for mounting a front differential to the frame of a vehicle that has been equipped with off road components to achieve proper alignment without decreasing ground clearance. In embodiments of the invention, the front differential may be attached to the frame using three different mounts: a right side (passenger side) arm, a left side (driver side) arm, and a rear mount (e.g., pinion mount). The mounting apparatus may be suitable for replacing the factory or OEM mounting components for securing front differential to a lifted vehicle with an independent front suspension and is operable to realign the vehicle drivetrain geometry to a factory configuration.

Embodiments of the present invention provide a right side arm and a left side arm that position a differential inside the vehicle chassis. The differential position may be between a front cross members and a rear cross member of the vehicle frame. Each of the arms may have an anterior end (e.g., front) and a posterior end (e.g., rear).

The anterior ends of the arms may attach to the front cross member with a plurality of threaded fasteners that thread into pre-existing locations on the front cross member. The pre-existing locations on the front cross member position the anterior ends of the arms to the underside (inferior) of the vehicle chassis and forward of the differential position. The posterior ends of the arms attach to the differential at the factory or OEM fastening locations, such as, a lateral, inferior, posterior, or a frontal location. In some embodiments, the factory or OEM differential may provide a lateral fastening location on the left side and an inferior fastening location on the right side. The front ends of the arms may secure directly to the cross member. The posterior ends of the arms may have bushings therein that interface between the arms and the differential fastening locations.

Embodiments of the present invention may have an exemplary differential that has a housing (e.g., casing) operable to enclose drivetrain components and connect a left side (driver side) axle and right side (passenger side) axle to a pinion output or input shaft. On one side (e.g. the left side) of the housing surface there may be a plurality of lateral fastening locations, and on another side (e.g., the right side) the axle connection may be separated from the differential with a front differential tube assembly. On the posterior end of the differential a pinion shaft housing may have fastening locations operable to receive a rear pinion mount. The pinion mount may connect the posterior end of the differential to a second cross member.

In embodiments of the invention, the right (passenger) side bracket may comprise a single integrated piece, having openings at one end (front) for engagement with the front cross member of the vehicle frame, and openings at the opposite end (rear) for engagement with the differential. In other embodiments, the right (passenger) side arm may comprise a chassis bracket at the anterior end, a differential bracket at the posterior end, and a connecting arm between these two brackets. In these embodiments, the chassis bracket fastens to pre-existing fastening locations on the bottom of the front cross member and the differential brackets fastens to the bottom of the differential tube assembly. The connecting arm may connect the brackets at an angle while maintaining the chassis and differential brackets parallel with each other. For example and without limitation, the connecting arm may connect to the chassis bracket at an angle ranging from 11-14 degrees to offset the top surface of the differential brackets a distance ranging from 1.15-1.5 inches from the top surface of the chassis bracket. The length of the connecting arm may vary on the OEM position of the front differential. In an exemplary embodiment, the differential bracket holes may have a diameter of 1.2 inches operable to secure a bushing assembly. In embodiments where the right side arm comprises a single piece, the arm may be formed from a sheet of material having appropriate angles to create the needed offset.

Embodiments of the present invention provide a left (driver) side arm comprising two attached brackets. In these embodiments, the left side arm comprises a first bracket having openings at the front for engagement with the front cross member of the chassis, and a second attached bracket with openings at the opposite end (rear) for engagement with the differential. However, the left side of the differential provides a plurality of mounting holes positioned on a lateral (side) surface of the differential housing, as opposed to underneath the differential. Because of this, while the first bracket is oriented in a generally horizontal plane for attachment to the cross member of the chassis, the second (differential) bracket is oriented perpendicular to the first (chassis) bracket in order to engage the openings on the side of the differential. The chassis bracket may thus attach to the bottom of the front cross member, and the differential bracket may mount laterally to a side of the differential. In most embodiments, the front ends of both the right side and left side arms are directly mounted to the cross member without a bushing or spacer, thereby increasing the clearance from the ground to the leading edge of the arms. The differential bracket location may have bushings therein to provide dampening for road vibrations and to prevent the transfer of vibration to the chassis and cabin. The geometry of the right side and left side arms may be generally derived from the mounting location of the differential and the chassis. For example and without limitation, a differential may have fastening holes positioned only on a bottom surface of the differential.

A plurality of bushings may be provided to interface between the differential and the left and right arms. Each bushing may comprise an assembly having a three piece construction where a compression sleeve is concentrically secured between two bushing halves. Each of the bushing halves may be the sleeve washer type (e.g., flange) where a washer is integrated into a sleeve. The washer portion may have an outer diameter that is larger than the outer diameter of the sleeve, but the washer and sleeve may share the same inner diameter. The sleeve portion may be concentrically positioned in the differential bracket holes and have a depth one half of the arm thickness. The sleeve halves may sandwich the differential bracket holes and the compression sleeve is concentrically placed in the inner diameter of the sleeve. The bushing halves may be constructed from common suspension materials such as rubber or urethane. A rubber bushing may be more suited for dampening road noise, vibrations and harshness and urethane bushings may have a longer life, enhances road feel, and performance.

In some embodiments, the right side arm and left side arm may be manufactured from plates having slots and tabs to positioned and align the chassis brackets and differential brackets at pre-determined angles depending on the expected misalignment of the vehicle drivetrain. For example, the right-side arm may comprise a chassis plate and a differential plate offset by an elongated arm. The chassis plate may have a slot on the rear end, and the differential plate may have a slot on the front end. The elongated arm may have tabs on the front and rear that align with the slots of the chassis plate and differential plate that position the elongated arm perpendicular to the two plates. The elongated arm may have different lengths depending on the necessary offset. The seam of the slot and tabs may be welded together in manufacturing, thereby forming a rigid right side arm. The left side arm may have a chassis plate with a slot for receiving a tab of a differential plate. The differential plate may be perpendicularly attached to the chassis plate. The left and right side arms may have openings with bushings to dampen the transfer of vibrations to the vehicle chassis. Each of the plates of the arms may be formed from weldable metals such as steel, aluminum, titanium, or other alloys, and should have a thickness of at least ⅜ of an inch. In some embodiments, the left and right arms may be provided in a single integrated piece; in other embodiments, the left and right arms may comprise multiple brackets and/or arms that may be welded together.

Attaching embodiments of the right and left side arms of the present invention may result in offsetting the position of the front differential by dropping and moving the differential forward from the location of the differential using OEM or factory arms. In some embodiments, and without limitation the offset drop may range from about ⅜ inch to about 1½ inches, and the forward positioning may be between about ⅛ inch and about ¾ inch. This change in position is needed when a vehicle has been equipped with off road components in order to realign the differential.

Embodiments of the present invention may also provide a rear pinion mount that attaches to the bottom of a differential's pinion shaft housing and to the top of a rear cross member of the chassis. The pinion mount may be secured to the rear cross member with a nut and bolt, and may be secured to the differential with openings that align with openings on the pinion shaft housing operable to receive a fastener that is threaded into the pinion mount. The pinion mount of the differential may also be provided with a bushing in the center for dampening the transfer of vibrations to the vehicle chassis.

In some aspects, the methods and apparatus of the present invention may further comprise a skid plate attached to the front cross member and the chassis front end and operable to shield the engine and drivetrain. It is to be appreciated that due to the nature of the front skid plate being mounted under the IFS and front differential sub frame assembly, that it must be fitted beneath the differential brackets. This ultimately limits the distance between the front skid plate and the ground. In embodiments of the present invention, the thickness of each forward differential arm connection at the sub frame is greatly reduced thereby allowing a new ultra-low profile front skid plate to be used. Therefore, when used in conjunction with embodiments of the present invention, a new ultra-low profile front skid plate is able to achieve ground clearance greatly exceeding OEM or existing aftermarket front skid plate designs that pass under traditional forward differential arm designs.

In some embodiments of the present invention, a novel differential pinion mount is provided (as shown in FIGS. 11-12) that uses frame mount bolt 343*b* which is inverted compared to the OEM pinon mount frame mount bolt. In these embodiments, an ultra-low profile heavy duty pinion mount component may be provided and integrated with the front skid plate in a manner that does not sacrifice any additional loss in ground clearance.

In some aspects, embodiments of the invention provide methods and apparatus for mounting a front differential to the pre-existing fastening locations of a lifted vehicle chassis that has been equipped with off road components, where the vehicle has an independent front suspension system. In these aspects, the apparatus may comprise a first side arm having a frame bracket and a differential bracket that may be separated by an elongated arm where the frame backet mounts to the bottom of a front cross member of the vehicle chassis, and the differential bracket has a plurality of mounting holes with bushings therein for mounting the differential bracket to the factory mounting location of the differential; a second side arm comprising a frame bracket at one end with holes for mounting the arm to the factory bolt locations on a front cross member of the vehicle chassis, and a differential bracket at the opposite end having a plurality of mounting holes with bushings therein for engaging with the factory mounting holes of the differential; at least one rear pinion mount operable to secure the differential to a rear cross member at pre-existing fastening location(s); and a plurality of bolts for fastening the first side arm and second side arm to the front cross member and to the differential, and for fastening the rear pinion mount to the rear cross member and to the differential; where the first arm, second arm, and rear pinion mount replace the factory components, and position the differential in a forward and lower position such that the drivetrain components of a lifted vehicle are realigned to the factory position while providing the vehicle with increased forward clearance.

In some of these aspects, the first side arm frame bracket and second side arm frame bracket may be mounted to the front crossmember on the same plane and are parallel with respect to each other. The differential mounts on the opposite end of the first side arm may be attached to factory mounting locations on the bottom of the differential; and the differential mounts at the opposite end of the second side arm may be attached to factory mounting locations on the side of the differential. Because of the positions of the factory mounting locations on the differential, it is to be appreciated that the differential bracket of the first side arm is generally parallel with the frame bracket of the first side arm, but the differential bracket of the second side arm is generally perpendicular to the frame bracket of the second side arm. In these aspects, an elongated arm may separate the frame bracket and differential bracket of the first side arm such that these brackets are offset from each other and are on different planes that are parallel.

In some of these aspects, the rear pinion mount may be operable to secure the differential on a pinion shaft housing that extends longitudinally out of the posterior face of the differential and to a rear cross member. The rear pinion mount may have a bushing therein for engaging between the differential and the rear crossmember. The bushings may be operable to dampen vibrations transferred from the drivetrain to the vehicle chassis. The right side arm differential bracket's factory mounting location may mount to an inferior position on a tube assembly that extends out laterally from the differential. The frame bracket of the first and second side arms may not have a bushing so as to increase the clearance under the cross member at the frame bracket mounting location.

As noted elsewhere herein, installing the left and right arms of embodiments of the present invention changes the position of the differential. In some embodiments, the forward position of the differential may range from about ⅜ inch to about 1½ inches from the factory position; and the differential may be at a lower position in a range of about ⅜ inch to about 2 inches from the factory position. In these embodiments, the elongated arm member of the first arm may attach to the frame bracket and differential bracket at an angle ranging from about 10 degrees to about 17.5 degrees, and may offset the brackets for a distance ranging from about ½ inch to about 2 inches. It is to be appreciated that these angles and offsets may be larger or smaller, and the amount of change in the forward and offset positions of the differential may be larger or smaller, depending on such factors as, without limitation, the size of the vehicle, the particular off road equipment that is installed, the size of the vehicle tires, and other factors.

In some embodiments, the bushings may comprise an assembly that includes two symmetrical sleeve bushings and a compression sleeve. The forward clearance may be measured from the base of the fasteners to the ground. The first side arm may be formed by cold working the material into the arm shape. The second side arm frame bracket may be formed such that the differential bracket center point is offset from the frame bracket. The second side arm frame bracket may be weldably attached to the differential bracket. The first side arm may be positioned on the passenger side of the differential, and the second side arm may be positioned on the driver side.

In other aspects, embodiments of the present invention provide methods and apparatus for mounting a front differential to the pre-existing fastening locations of a vehicle chassis that has been lifted as a result of the installation of off road equipment. In these aspect, the vehicle has an independent front suspension system, a front cross member and a rear cross member. A first side arm may be provided comprising a frame plate and a differential plate separated by an elongated arm, where the frame plate attaches to pre-existing fastening locations on the underside of a front cross member, and the differential plate has a plurality of mounting holes with bushings therein for aligning with pre-existing fastening location on said front differential. A second side arm may be provided comprising a frame plate operable to attach to a pre-existing fastening location on the bottom of a front cross member and a differential plate having a plurality of mounting holes with bushings therein for aligning laterally with the factory mounting holes of said differential. At least one rear pinion mount may be provided that may be operable to secure the differential to pre-existing fastening locations on a rear cross member. A plurality of bolts may be used for fastening the first side arm and second side arm to the front cross member and to the differential, and for fastening the rear pinion mount to the rear cross member and to the differential. The first and second side arms, and rear pinion mount replace the factory components and are operable to position the differential in a forward and lower position such that drive train components of a lifted vehicle are realigned to the factory position providing the vehicle with increased forward clearance.

In some aspects, a bushing assembly may be provided that includes two symmetrical sleeve bushings for securing concentrically in the mounting holes and having a flange operable to rest on the exterior surface of the differential plates. The bushings may include a compression sleeve nested inside the sleeve bushing and operable to align a bolt and dampen vibration. In these aspects, the first side arm is a passenger side arm and the second side arm is a driver side arm. The first side arm frame plate and differential plate may have slots operable to secure an elongated arm between each of the plates. The elongated arm may have a frame plate tab and differential plate tab on opposite ends, where the frame plate tab interfaces with a bottom surface of the frame plate and the differential plate tab interfaces with a top surface of the differential plate. The first side arm frame plate and differential plate may interface with the elongated arm at an angle that may range from between about 10 degrees and 17.5 degrees, although greater or lesser angles may be used to achieve proper alignment in vehicles of different sizes, with different wheels, with different off road equipment, etc.

The first side arm frame plate may attach to pre-existing fastening location with a through hole operable to receive a bolt for securing the plate to the front cross member. The second side arm frame plate may include a slot operable to align with a slot and tab on a differential plate such that the differential plate is perpendicular to the frame plate. The differential plate tab may interface with the frame plate on the bottom surface of the frame plate. The second side arm frame plate may attach to pre-existing fastening locations with a plurality of through holes operable to receive a plurality of bolts for securing the plate to the front cross member. There may be multiple holes (frequently two of them) for mounting the first side arm differential plate, and multiple holes (frequently three of them) for mounting the second side arm differential plate. In some embodiments, and without limitation, the differential forward position may range from about ¼ inch to about 1¼ inches, and the differential lower position may range from about ½ inch to about 2 inches. It is to be appreciated that the amount of change in the forward and offset positions of the differential may be larger or smaller, depending on such factors as, without limitation, the size of the vehicle, the particular off road equipment that is installed, the size of the vehicle tires, and other factors.

In embodiments of the invention, the pinion mount may be positioned between the rear pinion shaft housing of the differential and the top of the rear crossmember. Embodiments of the invention may further comprise a skid plate extending from the rear cross member to the front end of the vehicle, and may be operable to protect and cover the first arm, second arm, pinion mount, engine, and front differential. Embodiments of the invention may further provide for the removal of any centrally located jacking point on the front cross member.

Further aspects and embodiments will be apparent to those having skill in the art from the description and disclosure provided herein.

It is an object of the present invention to provide methods and apparatus for realigning a differential of a vehicle that has been equipped with off road components without using spacers in order to increase ground clearance below the vehicle.

It is another object of the present invention to provide methods and apparatus for realigning a differential of a vehicle that has been equipped with off road components using two differential arms that lower the differential and increase ground clearance under a front cross member.

It is a further object of the present invention to provide methods and apparatus for realigning a differential of a vehicle that has been equipped with off road components that allows an ultra-low profile skid plate to cover and protect the engine, differential, and mounting component.

It is a further object of the present invention to provide methods and apparatus for realigning a differential of a vehicle that has been equipped with off road components that includes a novel pinion mount that works with a skid plate to disperse forces acting on the vehicle frame to reduce stresses thereon and avoid damage.

It is a further object of the present invention to provide a differential mounting system operable to realign the front drivetrain of a lifted vehicle.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 20A is an exploded view of an exemplary bushing, according to an embodiment of the present invention.

FIG. 20B is a perspective exploded view of an exemplary bushing, according to an embodiment of the present invention.

FIG. 20C is an assembled view of an exemplary bushing, according to an embodiment of the present invention.

FIG. 21 shows a comparison of an embodiment of a passenger-side support arm of the present invention and an after-market support arm it is designed to replace.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Figure 17:
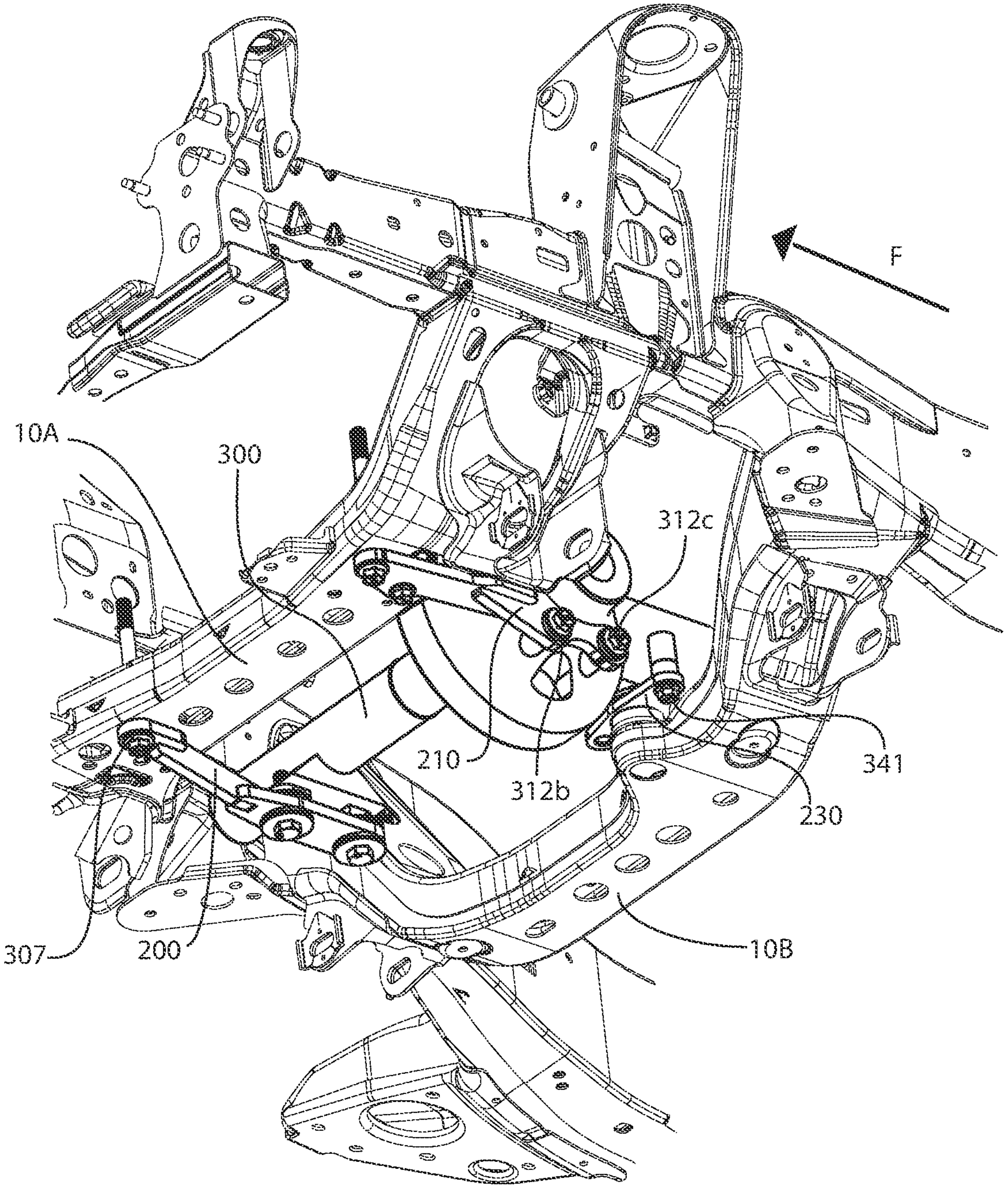
FIG. 17 is a perspective view of the underside of a vehicle chassis having a differential secured to the vehicle chassis using embodiments of a right side support arm, left side support arm, and differential pinion mounts of the present invention.
Figure 18:
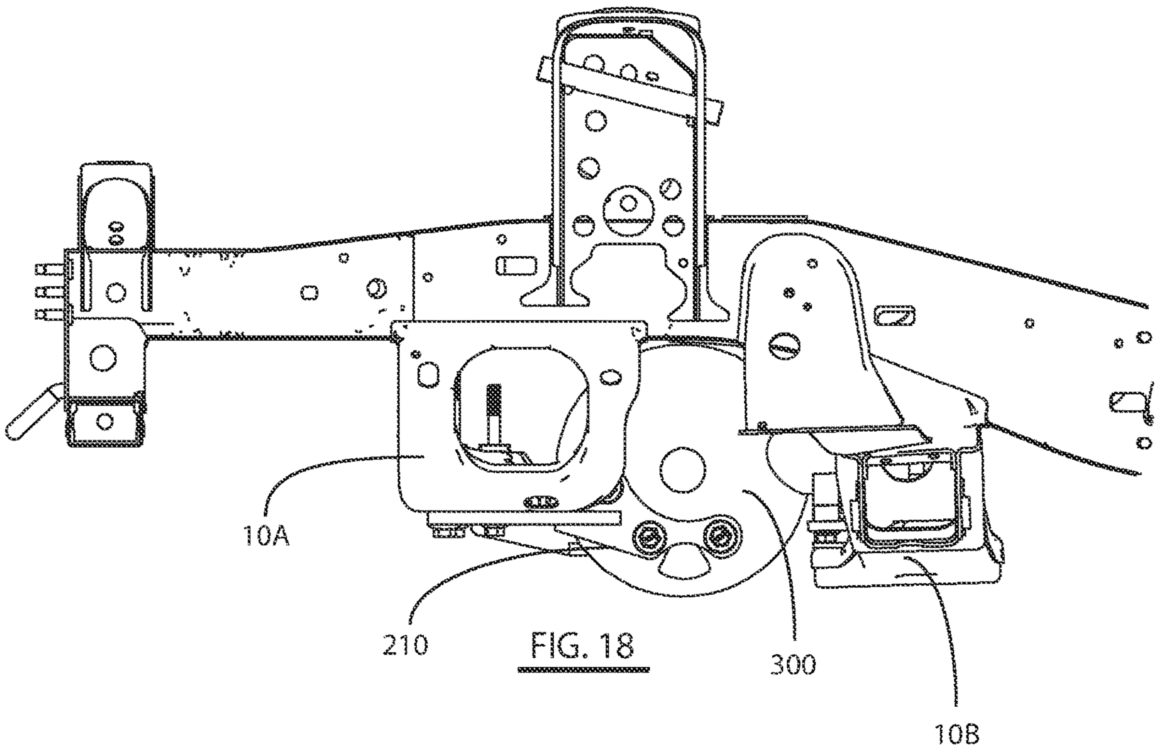
FIG. 18 is a driver side view of a vehicle chassis illustrating a differential secured thereto using a right side support arm, left side support arm, and pinion mount, according to an embodiment of the present invention.
Figure 19:
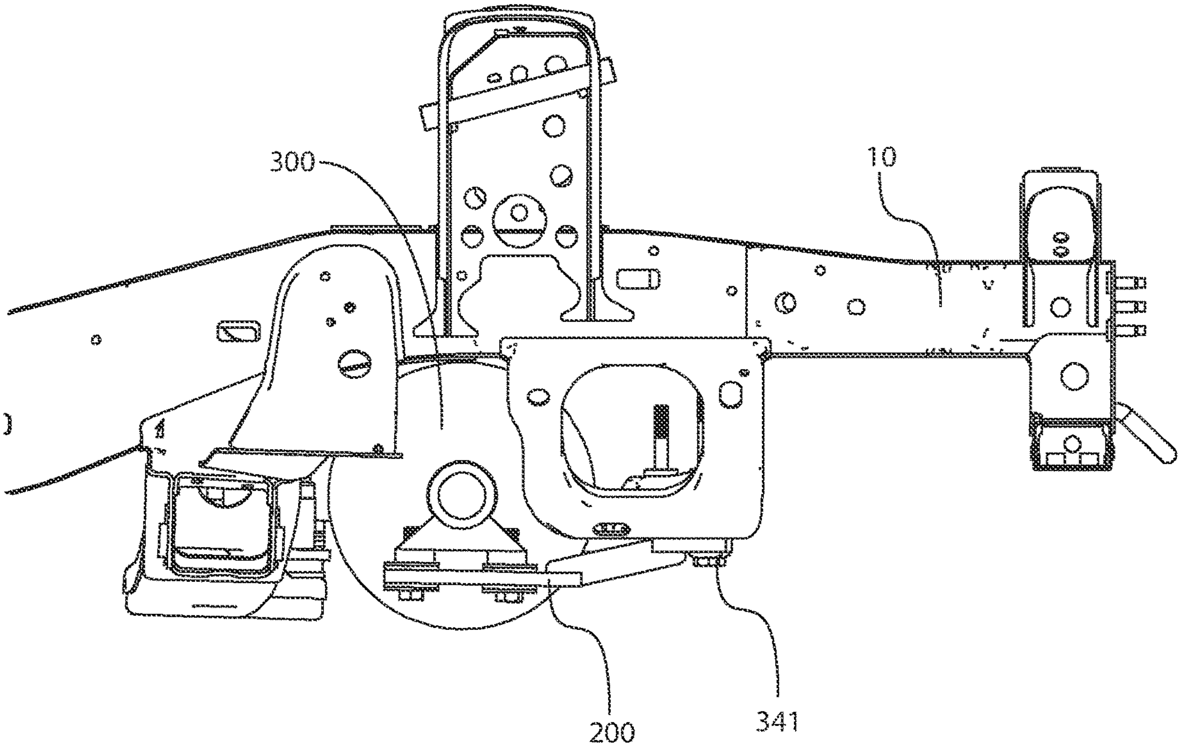
FIG. 19 is a passenger side view of a vehicle chassis illustrating a differential secured thereto using a right side support arm, left side support arm, and pinion mount, according to an embodiment of the present invention.

Referring to the drawings wherein like reference characters designate like or corresponding parts throughout the several views, and referring particularly to FIG. 17, it is seen that the illustrated embodiment of the present invention may be attached to a vehicle chassis having a lifted suspension and an independent front suspension. The illustrated chassis has a front, a rear, a right side (sometimes referred to as the passenger side), and a left side (sometimes referred to as the driver side). The front of a vehicle is represented by the directional vector "F" throughout the several views. The chassis may have a front cross member 10A and rear cross member 10B, as shown in FIG. 17. The chassis and cross members are sometimes referred to herein as the frame.

Figure 22:
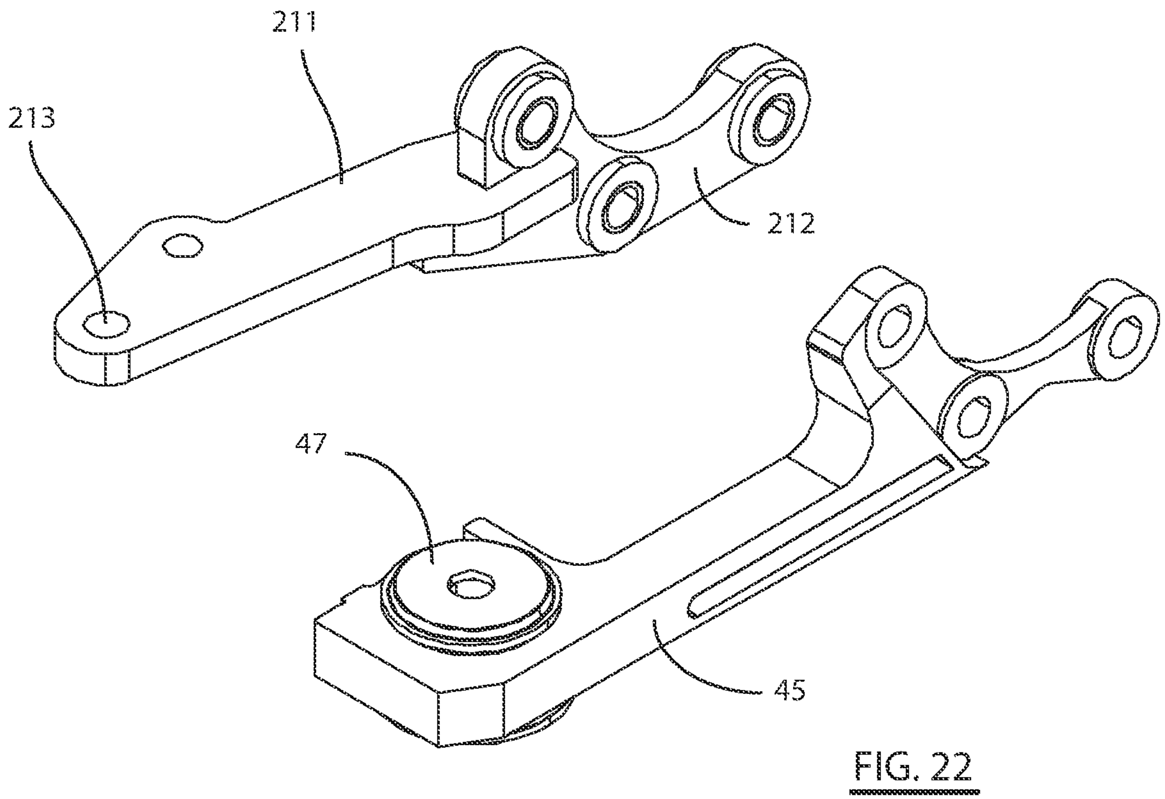
FIG. 22 shows a comparison of an embodiment of a driver-side support arm of the present invention and an after-market support arm it is designed to replace.
Figure 23:
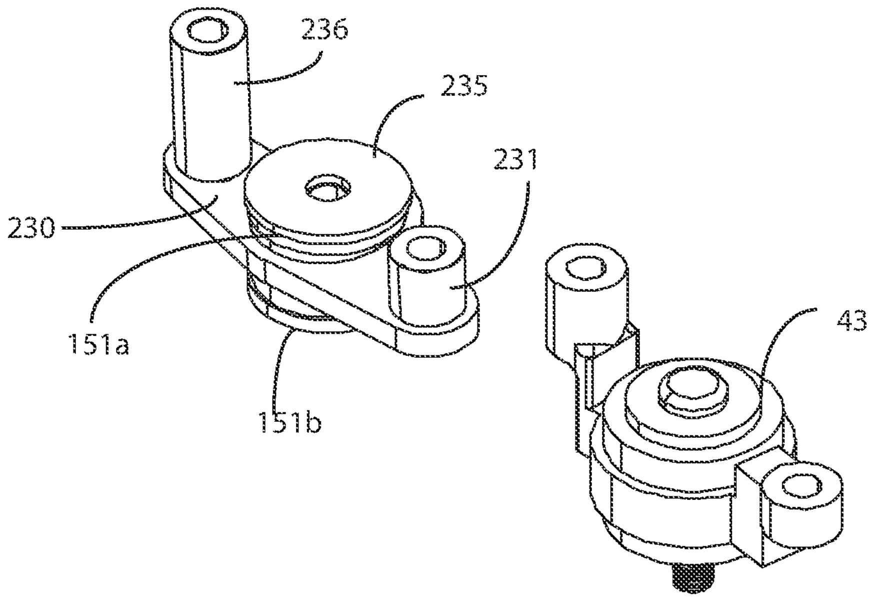
FIG. 23 shows a comparison of an embodiment of a pinion mount of the present invention and an after-market pinion mount 43 it is designed to replace.
Figure 24A:
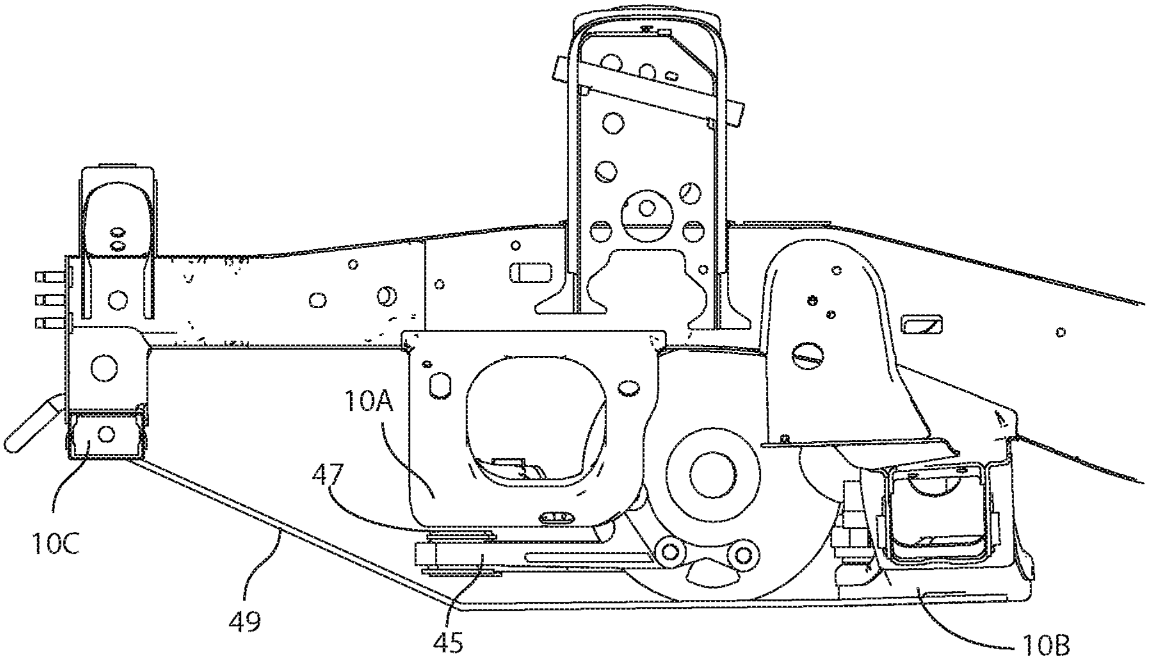
FIG. 24A (Prior Art)
FIG. 24A is a driver side view of a vehicle chassis and differential attached using after-market components and showing an after-market skid plate.
Figure 27:
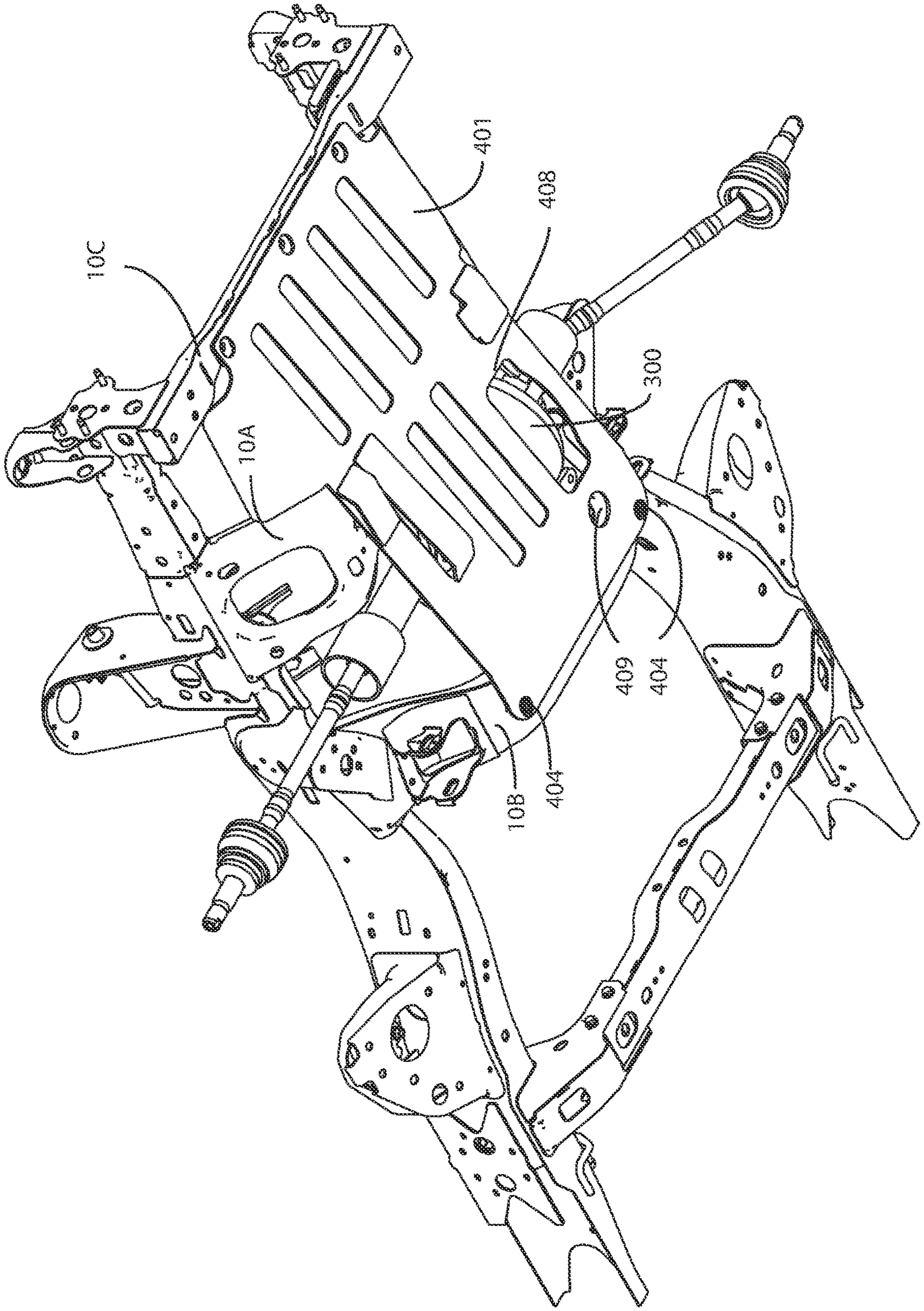
FIG. 27 is a bottom perspective view of an embodiment of a new skid plate and differential mounting arms of the present invention.
Figure 28:
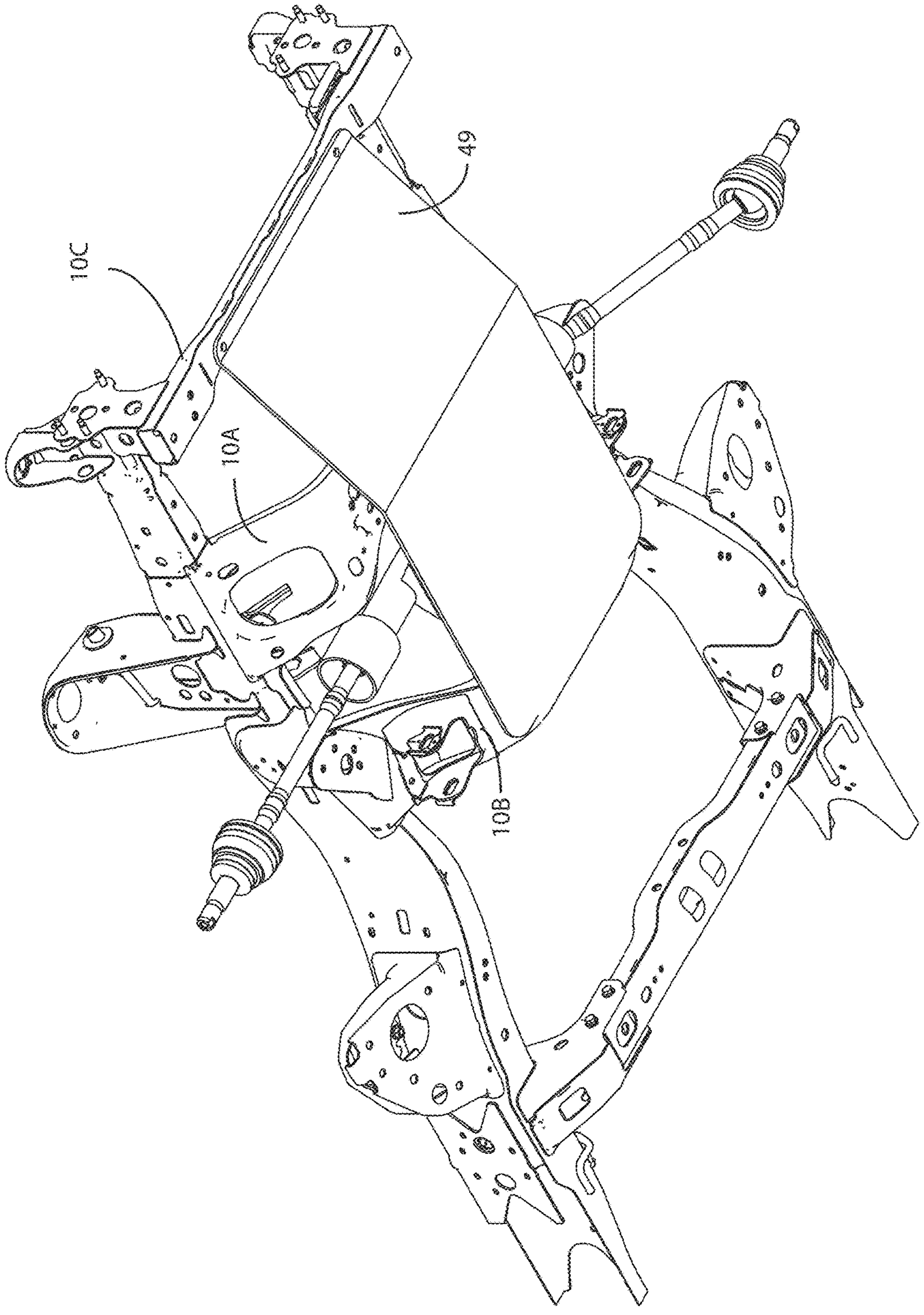
FIG. 28 (Prior Art)
FIG. 28 is a bottom perspective view of an after-market skid plate with OEM differential mounting arms.
Figure 29:
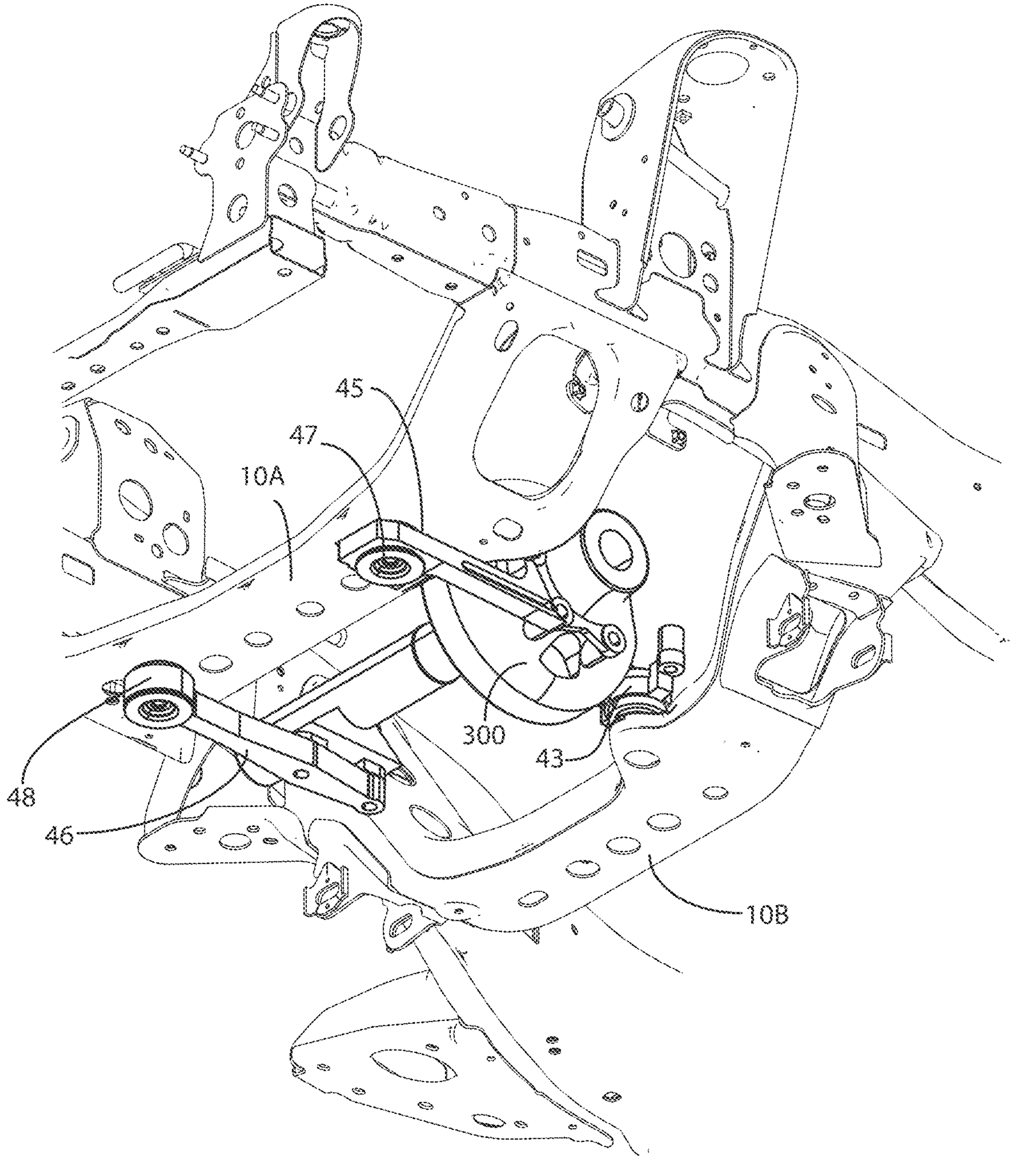
FIG. 29 (Prior Art)
FIG. 29 is a bottom perspective view of prior art after-market parts installed on a vehicle chassis to raise the chassis from the ground.
Figure 30:
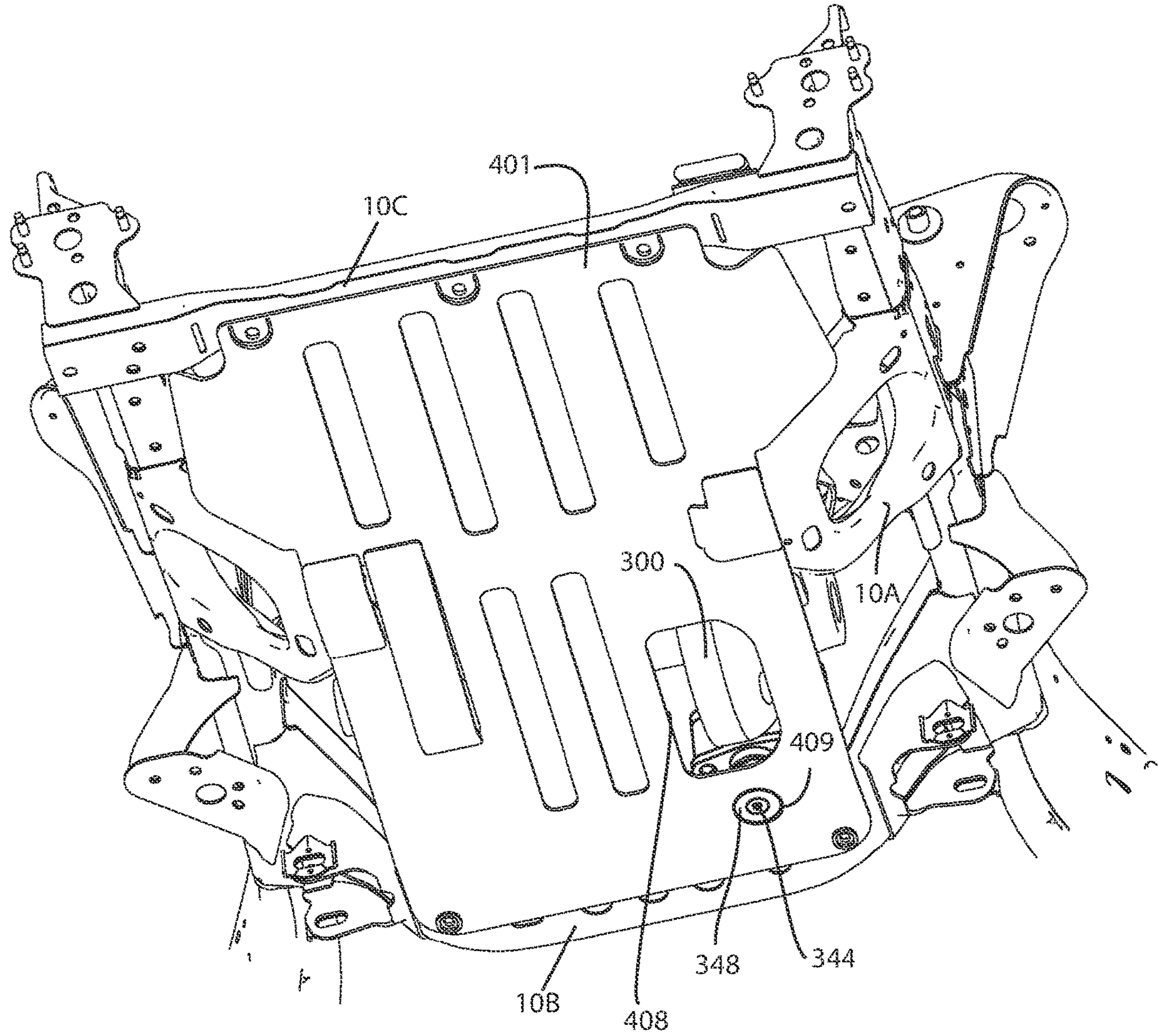
FIG. 30 is a bottom perspective view of an embodiment of the invention showing an embodiment of a skid plate and pinion mount that is flush with said skid plate.

FIGS. 21-23 illustrate the existing after-market parts that embodiments of the present invention are designed to replace. FIGS. 24A and 29 show these existing after-market parts installed on a vehicle chassis to raise the chassis from the ground. These parts include a pair of support arms 45 with large bushings 47 at the ends thereof. The bushings are needed to maintain alignment of the wheel axles after the chassis has been raised. While the support arms 45 raise the chassis increasing clearance, the large bushings 47 protrude downward thereby eliminating much of the clearance obtained. The loss of clearance is exacerbated if an after-market skid plate is then installed, as shown in FIG. 28. The improved clearance obtained by embodiments of the present invention is illustrated in the comparative view of FIG. 27 which shows an embodiment of a skid plate of the present invention that may be installed once the other parts of embodiments of the present invention are installed. The clearance obtained from embodiments of the present invention as illustrated in FIG. 27 is much better than that obtained using existing after-market parts illustrated in FIG. 28.

Figure 9:
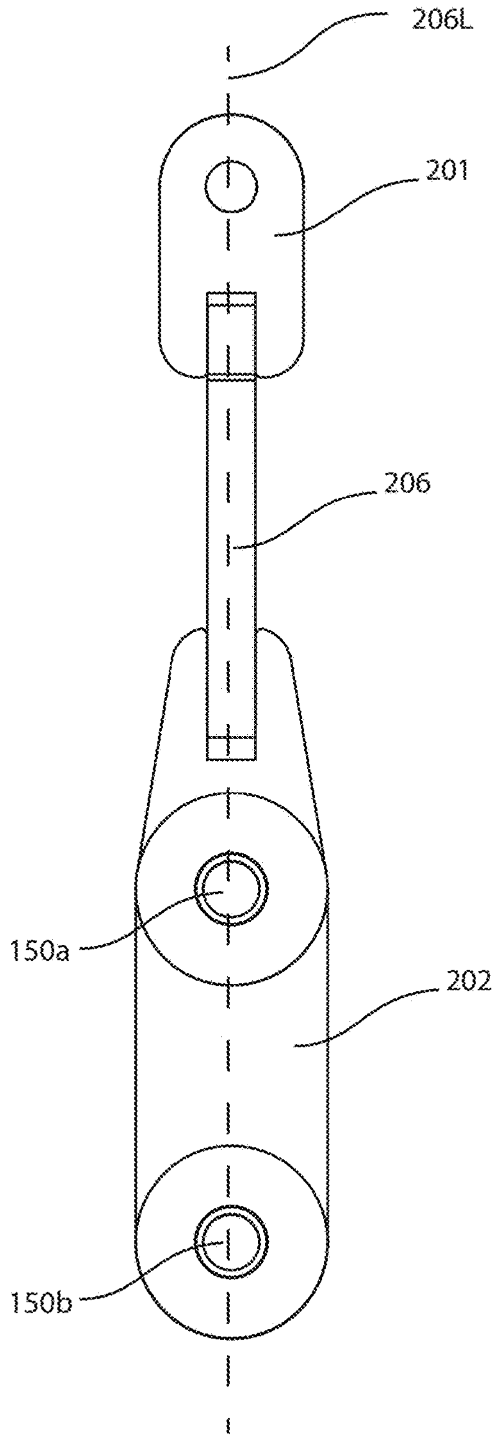
FIG. 9 is a bottom view of a right side (passenger side) support arm, according to an embodiment of the present invention.
Figure 10:
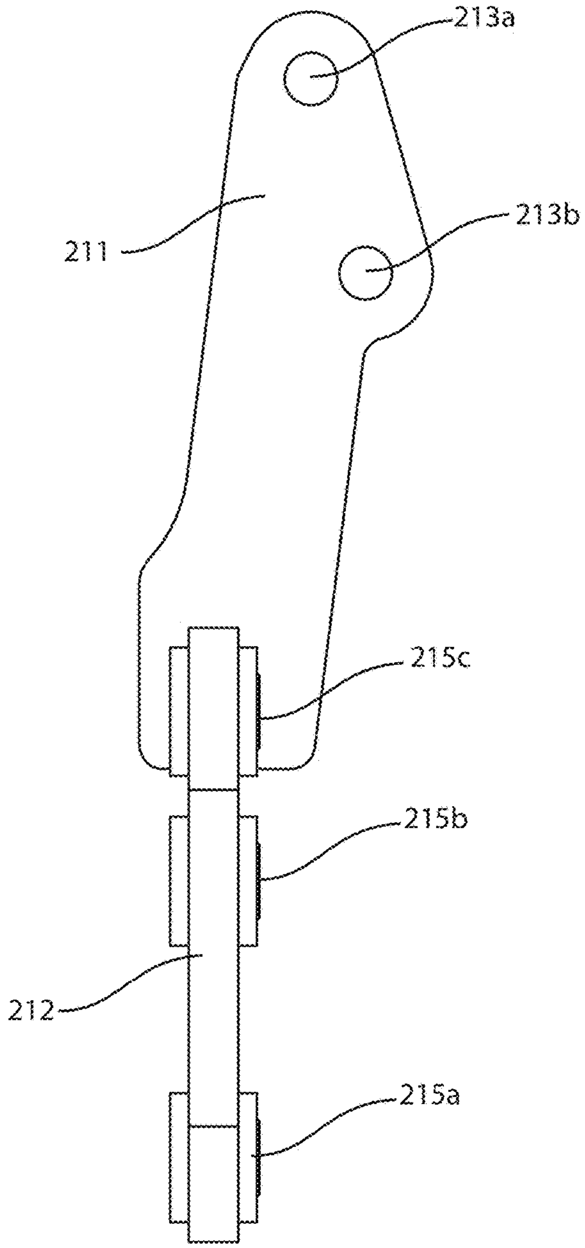
FIG. 10 is a bottom view of a left side (driver side) support arm, according to an embodiment of the present invention.
Figure 11:
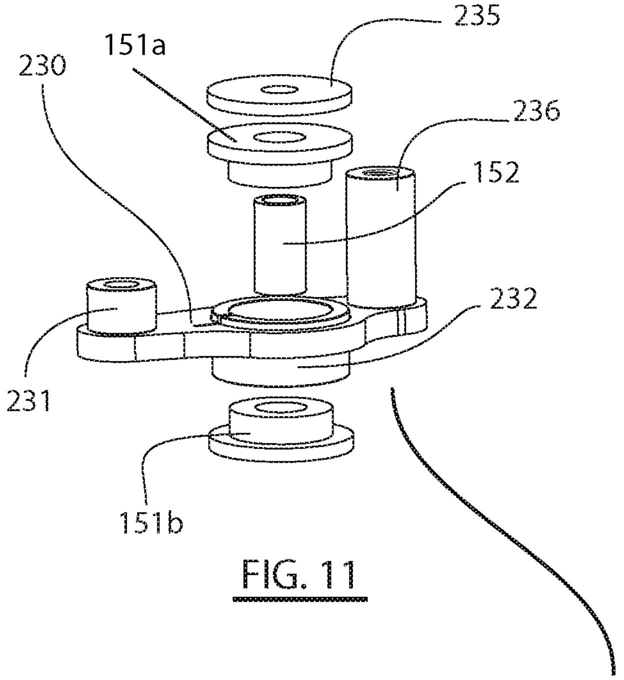
FIG. 11 is an exploded perspective view of a front differential pinion mount, according to an embodiment of the present invention.
Figure 12:
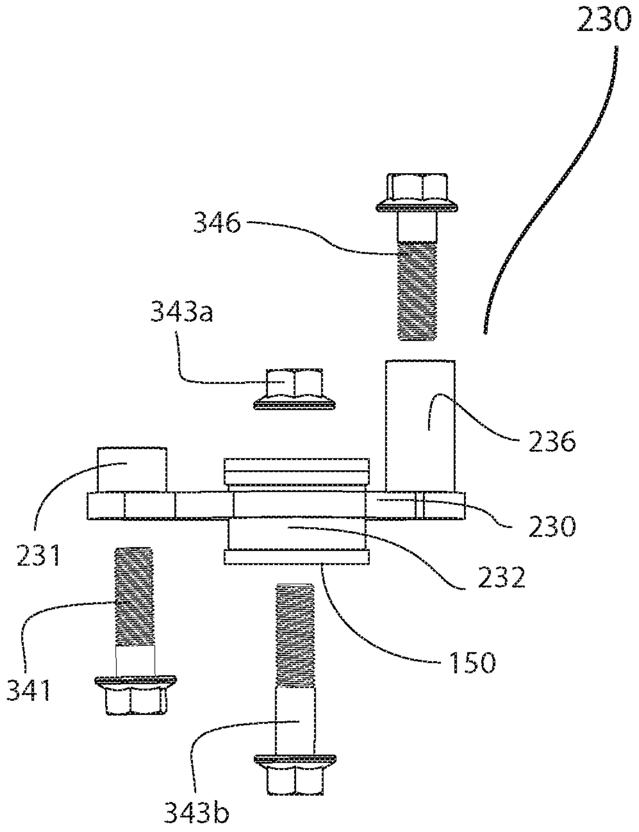
FIG. 12 is an exploded rear view of a differential pinion mount and fastening hardware, according to an embodiment of the present invention.

FIGS. 1-10 illustrate an exemplary embodiments of left side (passenger side) support arms 100, and right side (driver side) support arms 110; and FIGS. 11-12 illustrate an exemplary embodiment of a rear mount (e.g., pinion mount) 230. It is to be appreciated that the support arms 100, 110 and rear mount 230 are designed to move the differential forward and below the factory position of the differential in order to accommodate realignment following the installation of off road equipment on the vehicle.

Figure 1:
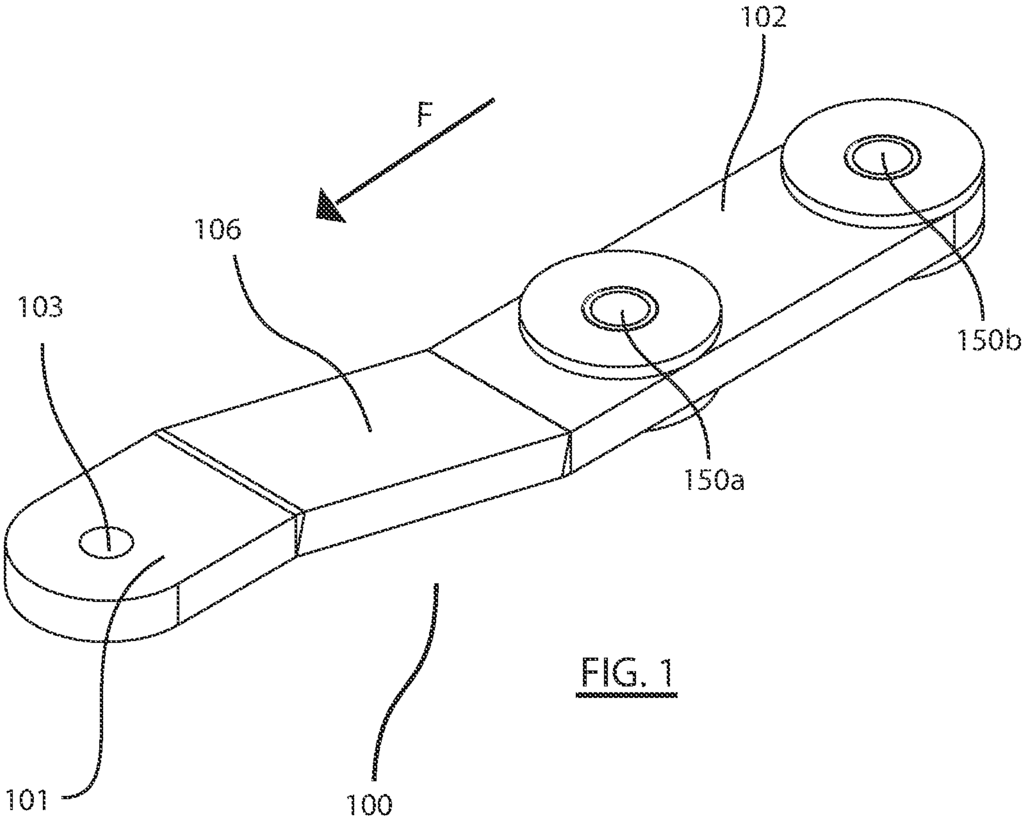
FIG. 1 is a perspective view of a right side (passenger side) support arm, according to an embodiment of the present invention.
Figure 2:
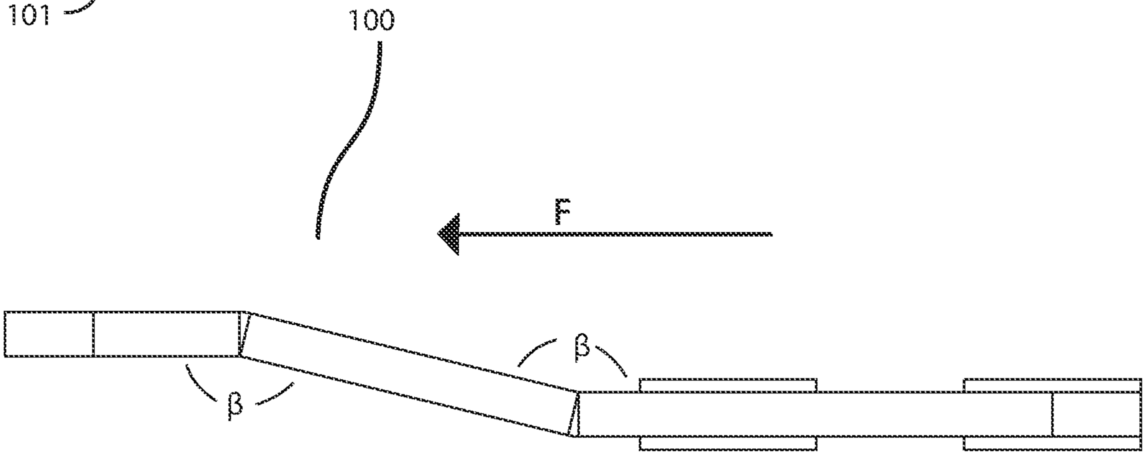
FIG. 2 is a side view of a right side (passenger side) support arm, according to an embodiment of the present invention
Figure 13:
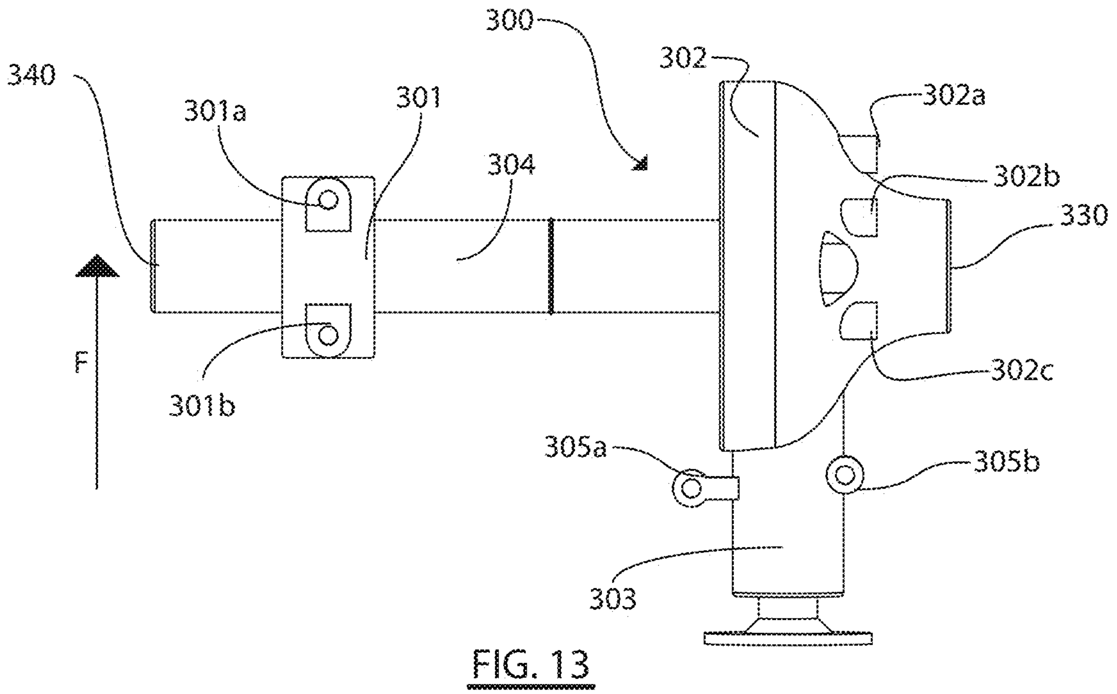
FIG. 13 is a bottom view of a front differential, according to an embodiment of the present invention.
Figure 14:
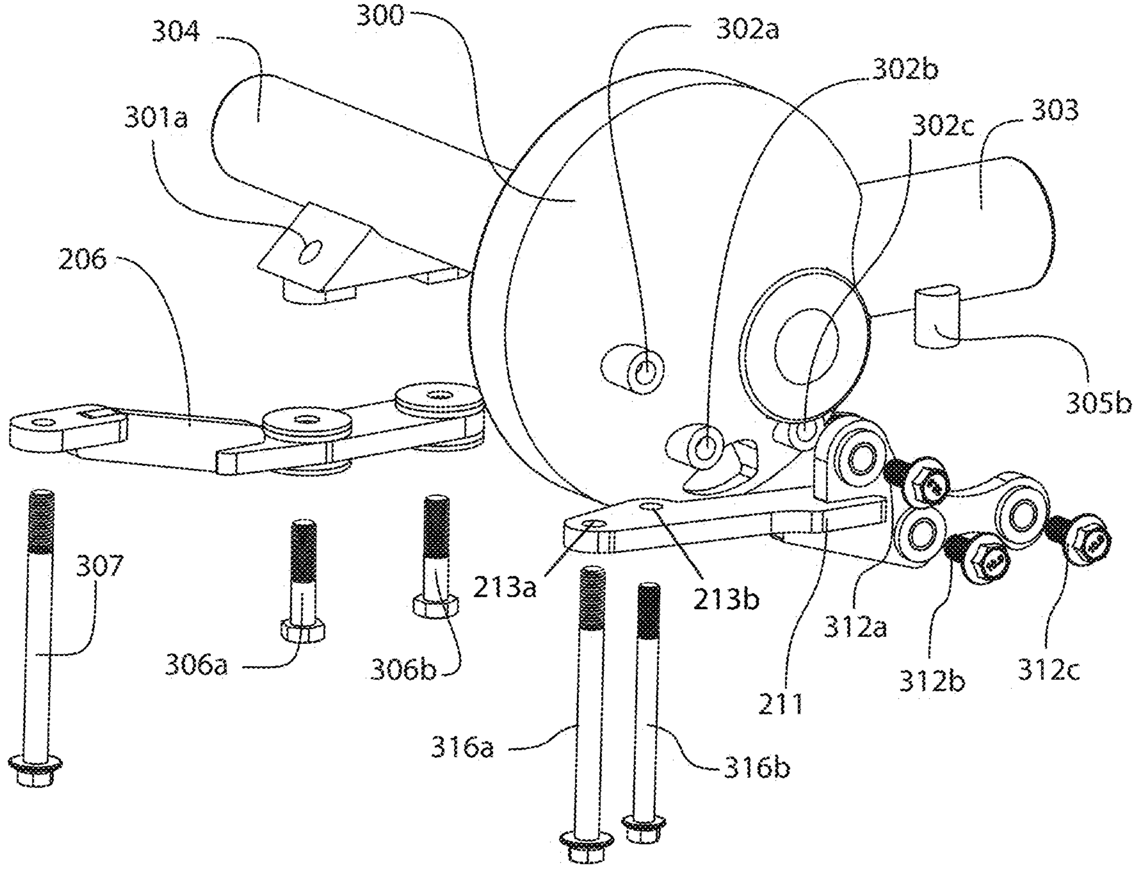
FIG. 14 is an exploded perspective view of the differential, right side arm, and left side arm assembly, according to an embodiment of the present invention.

Referring to the embodiment shown in FIGS. 1-2, it is seen that the illustrated right side (passenger side) support arm 100 may be an assembled (e.g. welded together) or an integrated part having an elongated central arm 106 connecting a frame bracket 101 to a differential bracket 102. The frame bracket 101 may have a through-hole 103 operable to secure the right arm 100 to the chassis 10 with a threaded fastener. The frame bracket 101 and the differential bracket 102 may be positioned on different planes establishing a bracket offset. Although the brackets 101, 102 may be offset, the frame bracket 101 and differential bracket 102 planes may be substantially parallel and separated by the elongated arm 106. The elongated arm 106 may interface with both brackets 101, 102 at the same angle β. This angle β may vary depending on the amount of differential offset desired, which may be dictated by such things as the size of the vehicle, the particular off road equipment installed, the size of the tires, and other factors. By way of example and without limitation, angle β may range from about 10 degrees to about 17.5 degrees, but which in any event is proportional to the offset required to drop the differential. In many scenarios, and without limitation, the desired drop of a differential may range from about ½ inch to 2 inch from a factory or after-market position, and the differential drop may be proportional to the offset of both brackets 101, 102. In embodiments of the left side support arm 100, a pair of mounting holes may be provided on differential bracket 102, which may receive a pair of concentric bushings 150*a*, 150*b*. These mounting holes and bushings 150 are designed to align with bolting locations 301*a*, 301*b* on the differential, for attachment using bolts 306*a* and 306*b*, as shown in FIGS. 13 and 14.

Figure 3:
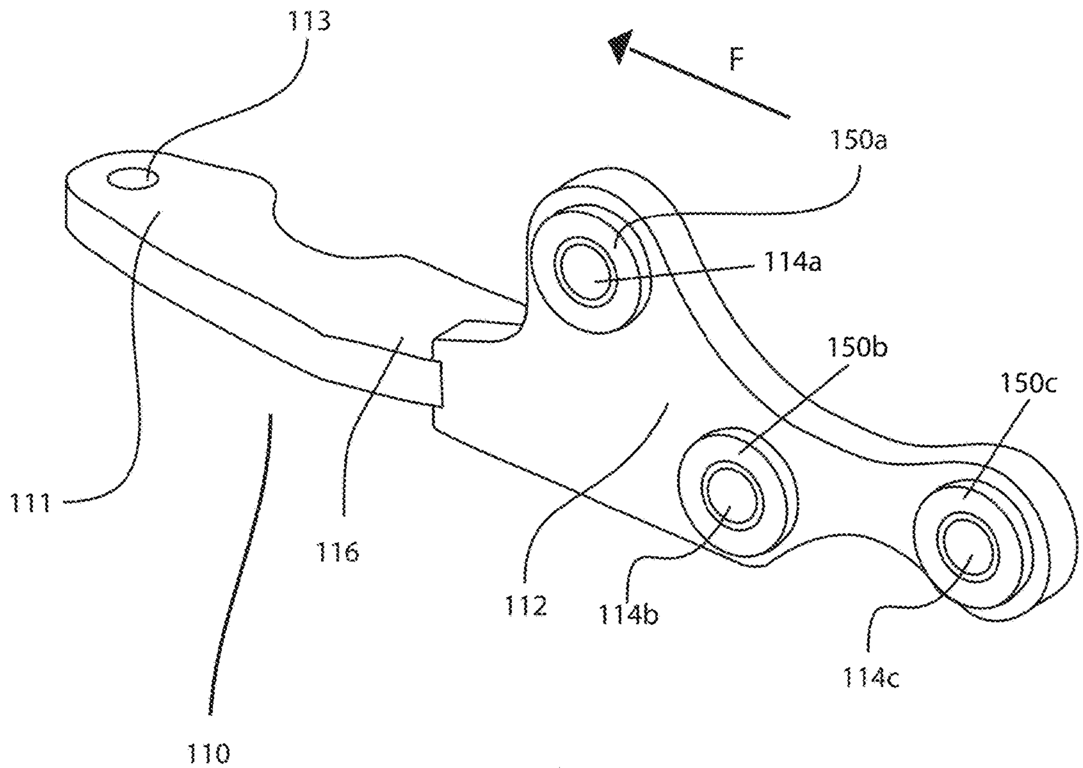
FIG. 3 is a perspective view of a left side (driver side) support arm, according to an embodiment of the present invention.
Figure 4:
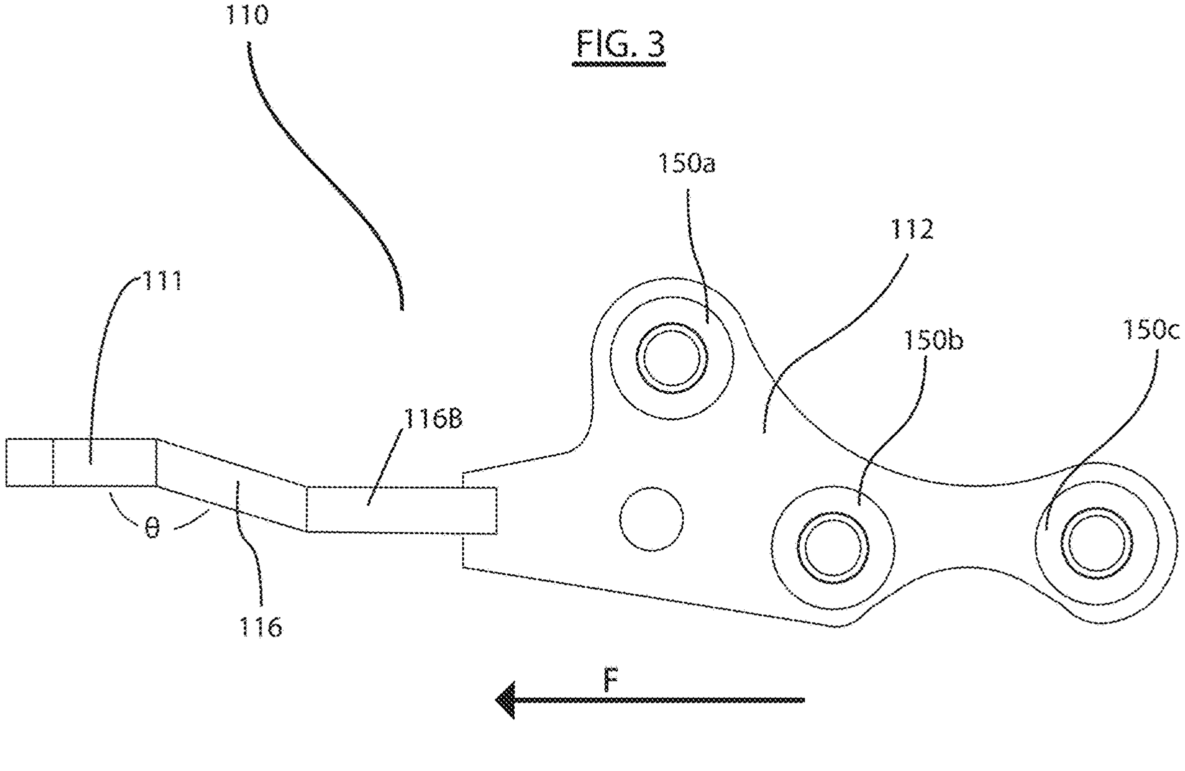
FIG. 4 is a side view of a left side (driver side) support arm, according to an embodiment of the present invention.

Exemplary embodiments of a left side (driver side) support arm 110 are illustrated in FIGS. 3 and 4, which may be assembled (e.g., welded together) or integrated into a single part. These embodiments have an elongated central arm 116 connecting between a frame bracket 111 and a differential bracket 112. The frame bracket 111 may have at least one mounting hole 113 operable to secure the leading end of the arm to a pre-existing location on the vehicle chassis 10. The differential bracket 112 may have a plurality of mounting holes 114*a*, 114*b*, 114*c* that may be fitted with bushings 150*a*, 150*b* and 150*c* which align with lateral mounting holes 302*a*, 302*b*, 302*c* provided on the differential 300, as shown in FIGS. 13 and 14. Because the differential mounting holes 302*a*, 302*b*, 302*c* are positioned on a lateral surface, it is seen that the frame bracket 111 and the differential bracket 112 may have a substantially perpendicular relationship. Embodiments of the elongated arm 116 may connect to the frame bracket 111 at an angle θ. This angle θ (like angle β of the passenger side support arm 100), may vary depending on the amount of differential offset desired which may be dictated by such things as the size of the vehicle, the particular off road equipment installed, the size of the tires, and other factors. By way of example and without limitation, angle θ may range from about 13.5 degrees to about 20 degrees. The elongated arm 116 angle θ may resolve to a planar plate 116B that is substantially parallel to the frame bracket 111 and may be operable to secure the differential bracket 112 perpendicular to the frame bracket 111. The elongated arm angle θ may offset the planar plate 116B and the frame bracket 111 a distance necessary to achieve realignment of the differential following installation of off road equipment, and may have a range of, without limitation, about ½ inch to about 2 inches from the factory or after-market position. The differential mounting holes 302*a*, 302*b*. 302*c* may each may have a bushing 150 therein for interfacing between the left side arm 110 and the differential housing 302.

Figure 5:
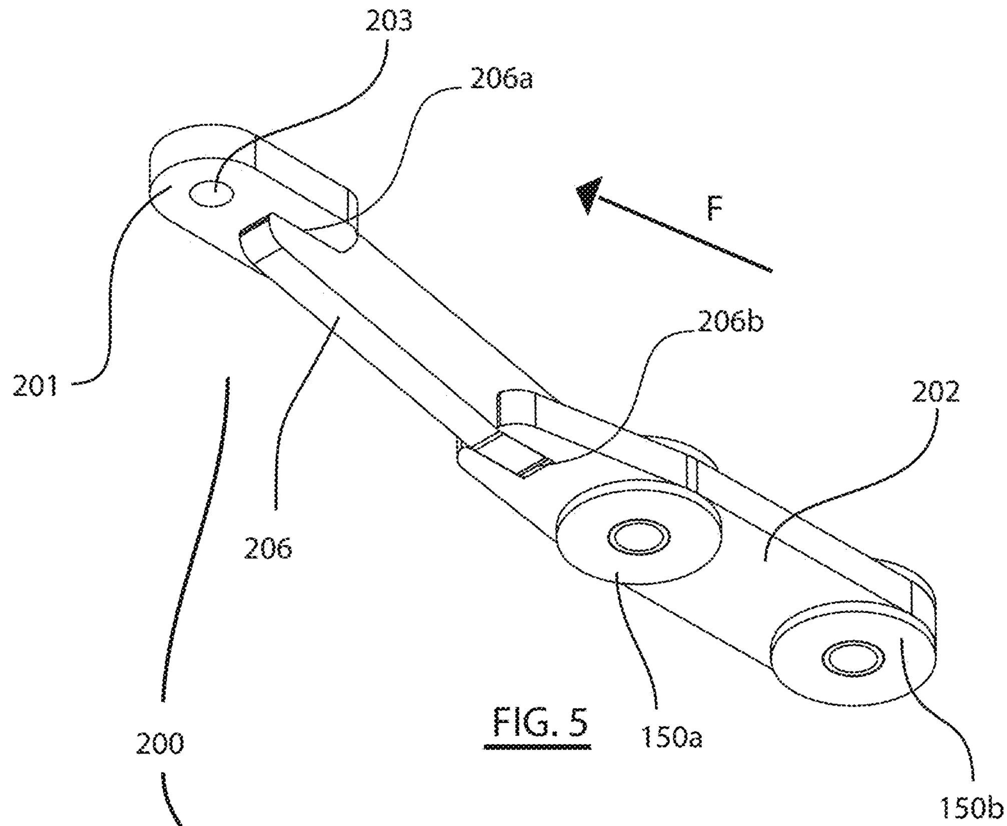
FIG. 5 is a perspective view of a right side (passenger side) support arm, according to an embodiment of the present invention.
Figure 6:
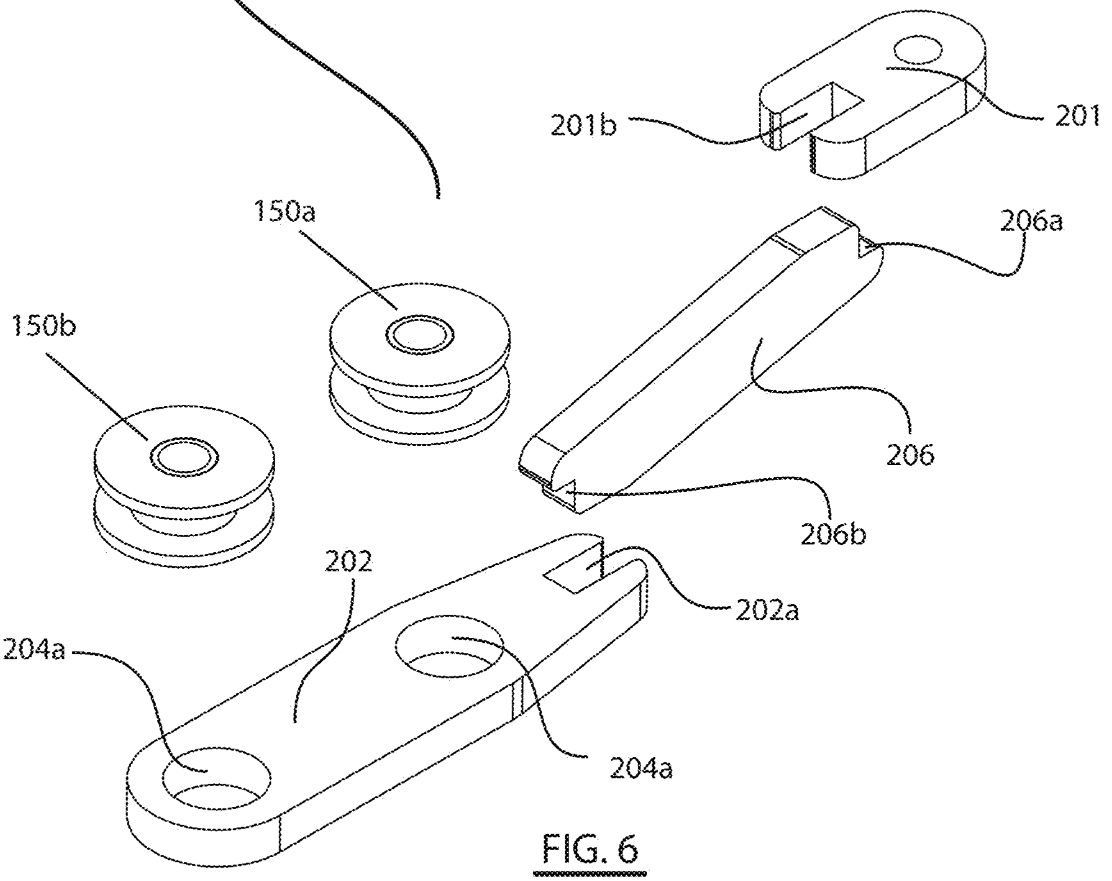
FIG. 6 is an exploded perspective view of the right side (passenger side) support arm, according to an embodiment of the present invention.

In other embodiments, the right side (passenger side) support arm may be manufactured from flat plates as shown in FIGS. 5-6 and FIG. 9. In these embodiments, the right side support arm 200 may be manufactured from weldable materials such as aluminum, titanium, steel, or metal alloys. The right side support arm 200 may have a frame plate 201 and a differential plate 202 having an elongated connecting arm 206 therebetween. The elongated arm 206 may be operable to offset the frame plate 201 from the differential plate 202 such that the differential has a position forward and lower in comparison to the factory position of the differential. The frame plate 201 and differential plate 202 may be secured to the elongated arm 206 with weldments. The elongated arm 206 may have tabs on each end of the arm 206*a*, 206*b* to aid with component alignment during manufacturing and strength of weld connection. The frame plate 201 may have a slot 201*b* positioned on a trailing end of the frame plate 201 and the differential plate 202 may have a slot 202*a* on the leading edge of the plate. The frame plate slot 201*b* and the differential plate slot 202*a* are secured to opposite ends of the elongated arm 206. For example and without limitation, the elongated arm tab 206*a* may align the frame plate slot 201*b* on a centerline of the elongated arm 206 and may be weldably fixed together. On the other end of the elongated arm 206, the tab 206*b* may align the differential plate slot 202*a* with the elongated arms 206 on the centerline and weldably fixed together. The interface of the tabs 206*a*, 206*b*, and the slot 202*a*, 201*b* may be welded along the seams created at the junction of the frame plate 201 and the differential plate 202 with the elongated arm. The elongated arm 206 may be perpendicular to the frame plate 201 and the differential plate 202. The frame plate may have one through hole 203 operable to align the arm 200 with the chassis front crossmember 10A, the differential plate 202 may have at least two through holes 204*a*, 204*b* that are operable to align the arm with the factory positions on the differential housing 302. The frame plate may be attached to the vehicle chassis with the fastener 307. The differential plates through-holes 204*a*, 204*b* may each have a bushing assembly 150*a*, 150*b* operable to align the shaft of the respective fastener 306*a*, 306*b*. See FIGS. 13-14.

Figure 7:
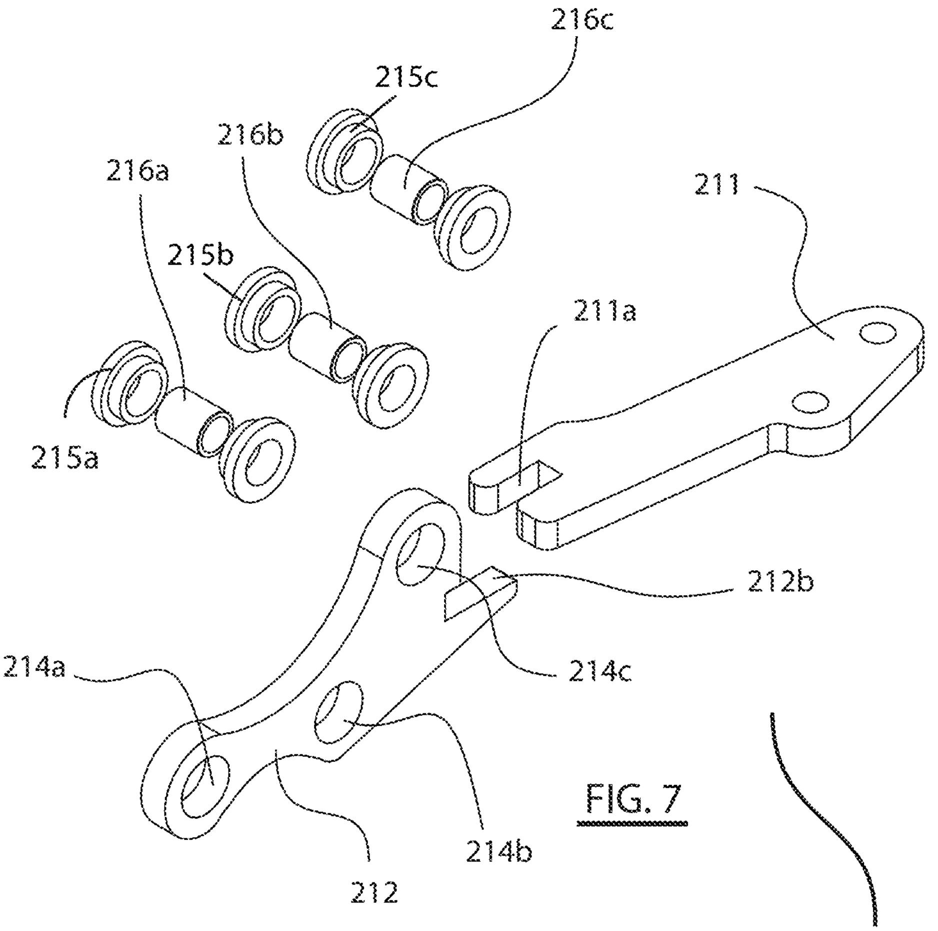
FIG. 7 is an exploded perspective view of the left side (driver side) support arm, according to an embodiment of the present invention.
Figure 8:
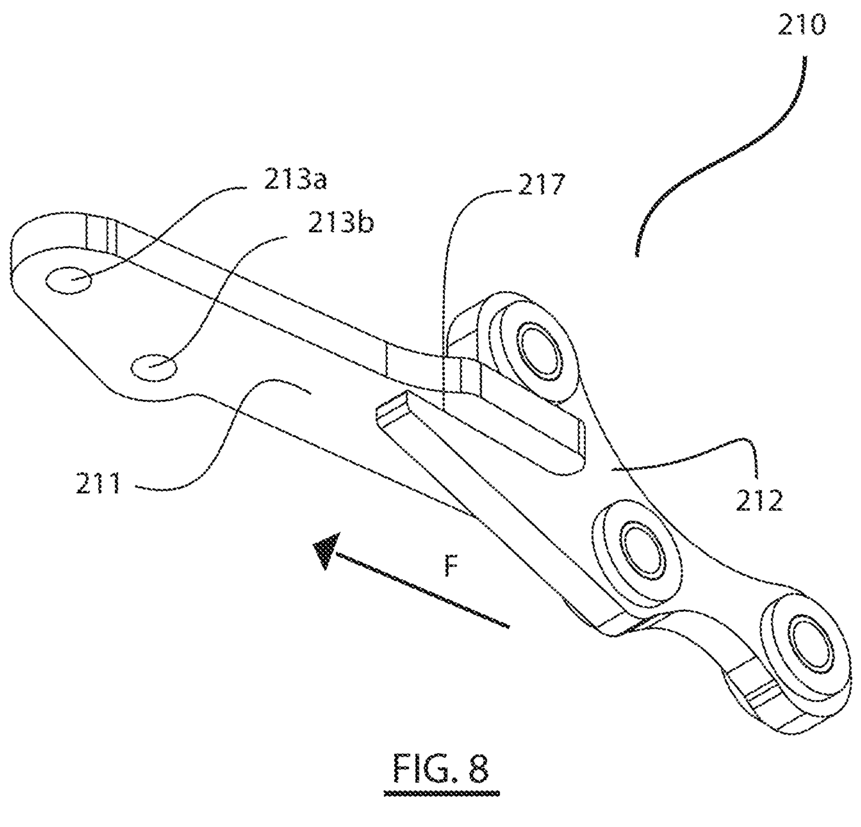
FIG. 8 is a perspective view of a left side (driver side) support arm, according to an embodiment of the present invention.

FIGS. 7, 8 and 10 illustrate another embodiment of a left side (driver side) support arm 210. In these embodiments, arm 210 may be constructed from a frame plate 211 and a differential plate 212 that are weldably secured together at a reciprocal slot and tab location. For example, the frame plate 211 may have a slot 211*a* on a trailing end and the differential plate may have a tab 212*b* on the leading edge that align the plates together to form the arm 210. When the tab 212*b* and the slot 211*a* are connected edges 217 are formed and the plates are welded together at the edges 217. The frame plate 211 may have a pair of through holes 213*a*, 213*b* that are operable to secure the arm to the front cross member 10A using fasteners 316*a*, 316*b* (as shown in FIG. 14), and the differential plate 212 may have a plurality of through-holes 214*a*, 214*b*, and 214*c* that are operable to align with factory holes on the differential 302*a*, 302*b*, and 302*c*. The differential plate 212 may be fashioned perpendicular to the frame plate 211 similarly to the factory one, however the alignment holes 214*a*-214*c* may have a position that is rotated about the mounting location on the frame as is discussed further below. The alignment holes 214*a*, 214*b*, 214*c* each may be equipped with a bushing 215*a*, 215*b*, 215*c* and each may have a compression sleeve 216*a*, 216*b*, 216*c* therein to interface between shaft of a threaded fastener 312*a*, 312*b*, and 312*c* and the compression sleeves corresponding bushing.

FIGS. 11 and 12 illustrate an exemplary embodiment of a pinion mount 230. In these embodiments, the pinion mount 230 may be positioned between the differential 300 and a rear cross member 10B. As described above, support arms 100, 110 and/or 200, 210 secure the front side of the differential to the frame. Embodiments of rear mount 230 secure the rear end of the differential at the pinion shaft housing 303. Embodiments of the pinion shaft housing 303 may have a through hole flange 305*a* that aligns an embodiment of a threaded pinion mount flange 236 of the present invention; and a threaded flange 305*b* that aligns an embodiment of a pinion mount through hole 231 of the present invention. Embodiments of the threaded pinion mount flange 236 may be secured to the through hole flange 305*a* with fastener 346, and the pinion mount through hole 231 may be secured to the threaded flange 305*b* with fastener 341. Embodiments of the pinion mount 230 may have a bushing assembly 150 centrally positioned in an extension of the mount 232 and may have a washer 235 that is placed atop the bushing 150. Embodiments of the pinion mount 230 may be positioned above the rear cross member 10B and a fastener 343*b* may penetrate through the cross member 10B from below to fix the mount 230 in place. In some embodiments, the thickness of the pinon mount may be at least ⅜ less than the after-market or factory pinion mount.

An exemplary vehicle differential 300 including a housing 302 (e.g., casing) that encloses drivetrain components is illustrated in FIG. 13. The drivetrain components may connect a pinion gear orthogonally and the housing may have a shaft housing 303 aligned with the pinion gear. A front differential tube assembly 304 may be centered in line with the gearing in the housing 302 and perpendicular to the pinion shaft housing 303. The tube assembly 304 may have a connector operable to receive a passenger side (e.g., right side) axle, and the differential housing 302 may have a shaft output/input 330 operable to receive the connector of a driver side (e.g., left side) axle. The differential 300 may be connected to the vehicle chassis 10 between a front cross member 10A and a rear cross member 10B. See FIGS. 15 and 16. The pinion shaft housing 303 may have a through hole 305*a* and a bolting location 305*b* that is operable to secure a pinion mount 230 that is fixed above the rear cross member 10B. See FIG. 17. The tube assembly 304 may have a fixed flange 301 having two bolting location 301*a* and 301*b*, that receive a right side arm (100, 200) (e.g., passenger side). The differential housing 302 may have three lateral mounting holes 302*a*, 302*b*, 302*c* that secure a left side arm (110, 210) (e.g., driver side) perpendicular to the cross members 10A, 10B. See FIGS. 13 and 14.

Referring to the embodiment illustrated in FIGS. 13 and 14, the passenger side of front differential housing 302 may include a front differential tube assembly 304 secured to the differential. The tube assembly 304 may have a flange 301 having two threaded holes 301*a*, 301*b* for receiving the bolts 306*a*, 306*b* and securing the passenger side arm 200 to the tube assembly. In some embodiments, the tube assembly flange 301 may have a plurality of through holes. On the driver side there may be threaded holes 302*a*, 302*b*, and 302*c* operable to align and secure the right side arm 210 to the differential with the bolts 312*a*, 312*b*, and 312*c*. A pinion shaft housing 303 may be provided on the differential 300 and may be orthogonal to the tube assembly 304.

Figure 15:
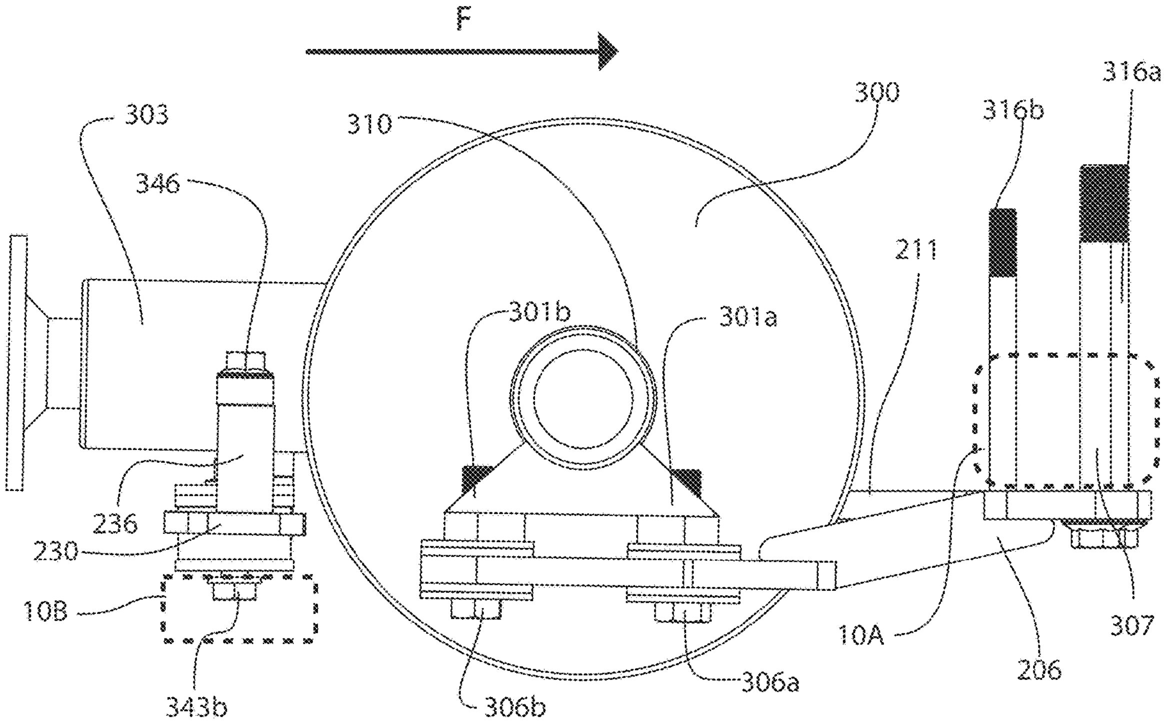
FIG. 15 is an exemplary passenger side view of a differential secured to a vehicle chassis showing a right side support arm and a differential pinion mount, according to an embodiment of the present invention.
Figure 16:
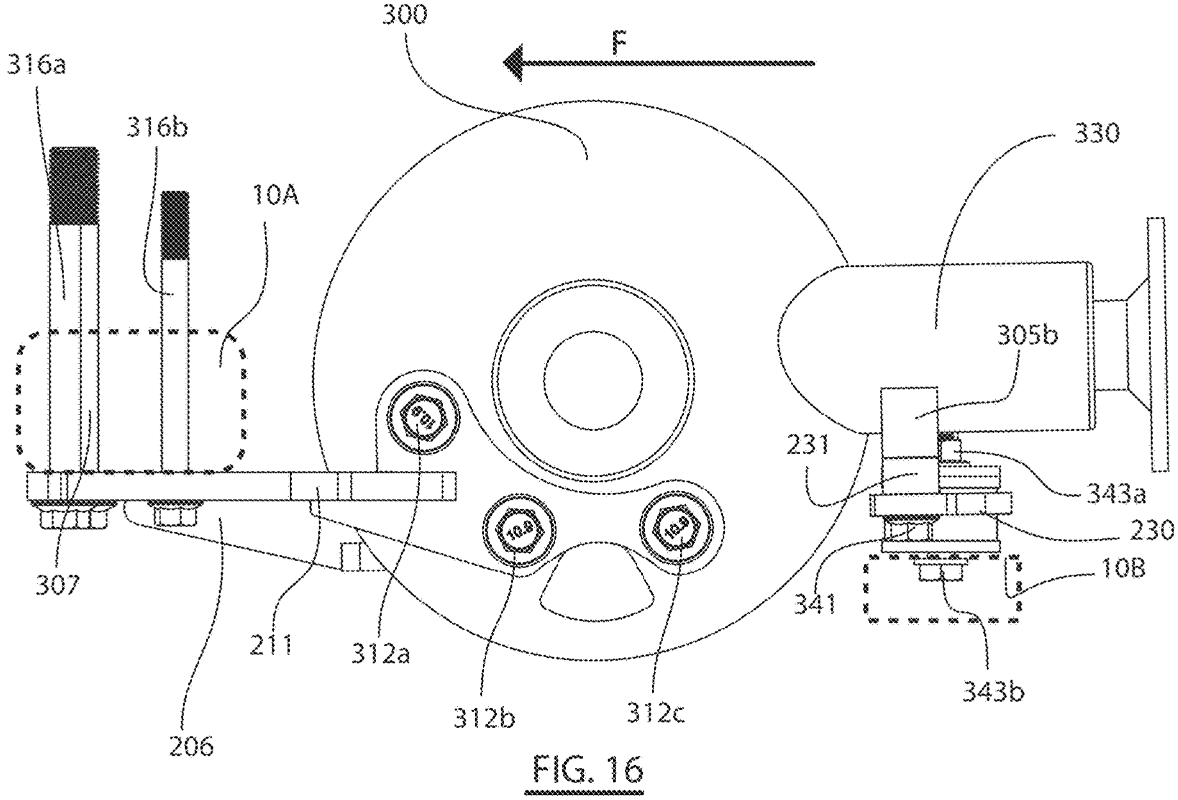
FIG. 16 is an exemplary driver side view of a differential secured to a vehicle chassis showing a left side support arm and a differential pinion mount, according to an embodiment of the present invention.

FIGS. 14-16 illustrate exemplary steps for reinstalling a differential 300 to an exemplary vehicle chassis 10. FIG. 14 shows the front support arms 200, 210 being attached to the differential mounting locations 301 and 302*a*, 302*b*, 302*c*. A right side support arm 200 may be fastened to the differential tube assembly 304 at the flange 301 with the fasteners 306*a* and 306*b* that align with the holes 301*a* and 301*b*. A left side support arm 210 is laterally attached to the differential housing 302 with fasteners 312*a*, 312*b*, 312*c*. A rear pinion mount 230 is secured between the pinion shaft housing 303 and the rear cross member 10B. The front arms 200, 210 attach to the front crossmember 10A share the same plane. The differential bracket 212 has a geometry operable to mount around the output shaft 330 such that there is no interference with the axle. Because there are no bushings placed between the front cross member 10A a low profile skid plate can be fixed to the undercarriage of the vehicle chassis 10.

FIGS. 20A-20C illustrate exemplary bushings 150 of the present invention. These exemplary bushings 150 may have a three-piece construction where a compression sleeve 152 aligns a first sleeve bushing 151*a* and a second sleeve bushing 151*b*. The first and second sleeve bushings 151*a*, 151*b* may be symmetrically positioned about the mid line of the compression sleeve 152 and may have identical geometries. The geometry may be flange like where the diameter Di is sized to fit snuggly in the arm mounting holes and outer diameter Do is sized to sandwich the arm where the arm may fit has a thickness T. The length of the compression sleeve 152 may be the combined length of the first and second sleeve bushings 151*a*, 151*b*.

Figure 24B:
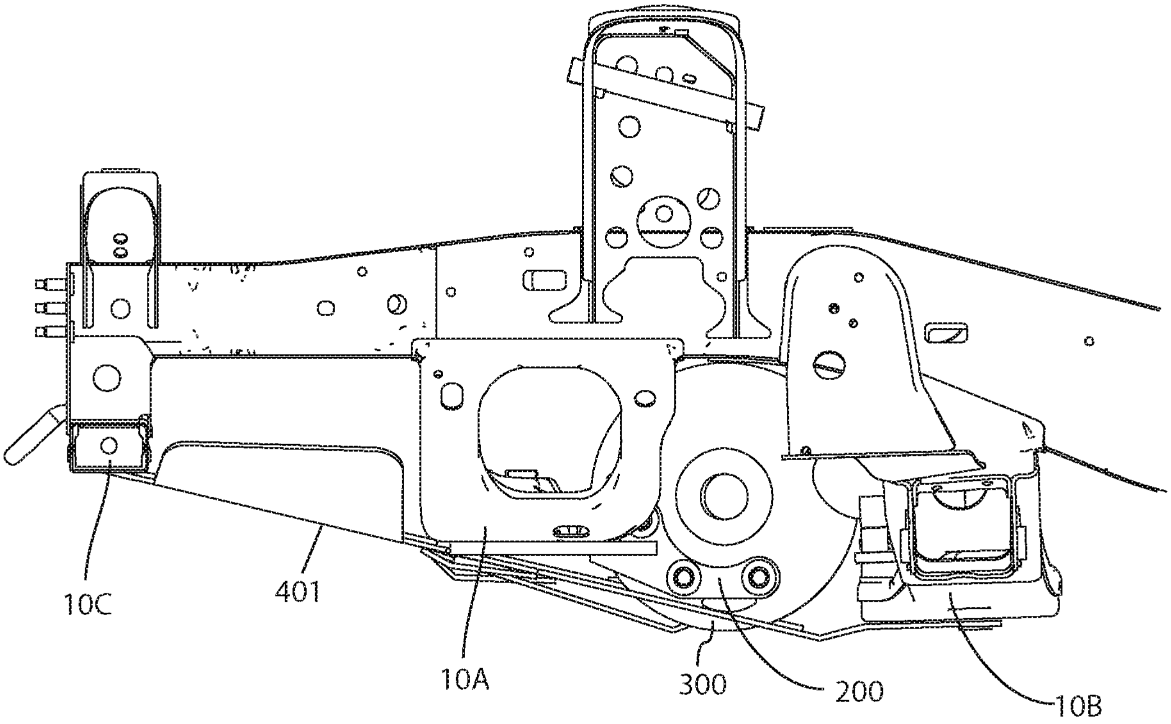
FIG. 24B is a driver-side view of a vehicle chassis and differential attached using an embodiment of the invention including an embodiment of a skid plate.

Referring to FIGS. 24A and 28, it is seen in that existing after-market arms 45, 46 have bushings 47, 48 that are bulky, requiring a large skid plate 49 that provides little vertical clearance. However, in embodiments of the invention such as that shown in FIGS. 24B and 29, it is seen that the right side (passenger) support arms 100, 110 along with left side (driver) support arms 200, 210 allow an embodiment of a skid plate 401 to be provided that is much closer to the vehicle frame, thereby allowing significantly more clearance. In embodiments of the invention, a small portion of the differential 300 may extend through an opening 408 in skid plate 401. Embodiments of skid plate 401 may be provided with a plurality of bolts or other fasteners 404 for attachment to rear chassis cross member 10B, and to a further front chassis member 10C such as a radiator support, part of a front fender, etc. In embodiments of the present invention, because the bushings are provided at fastening locations on the differential, instead of underneath chassis 10, a vehicle equipped with an embodiment of the invention may maintain a greater ground clearance along a longer length of the vehicle chassis, thereby enabling the vehicle to approach a rock grouping with a more aggressive angle of attack.

Figure 31:
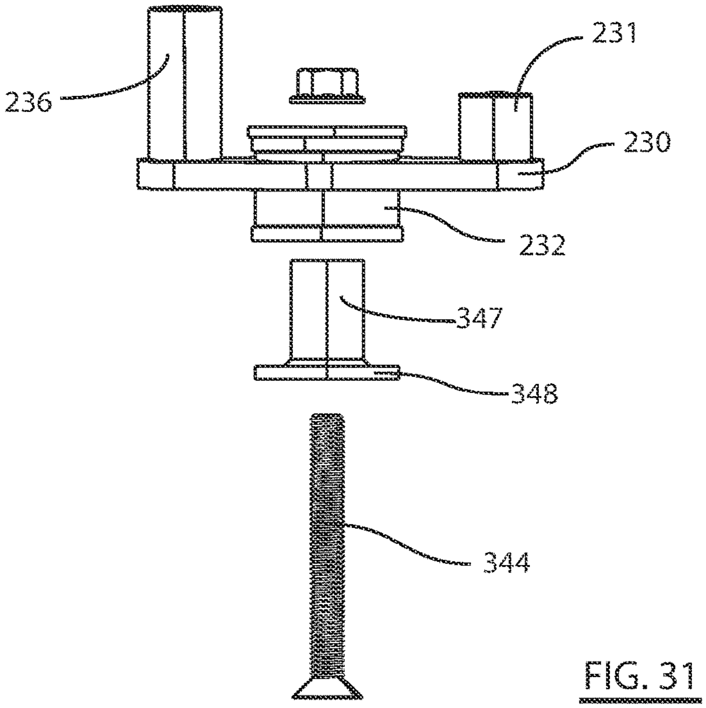
FIG. 31 is an exploded view of an alternative embodiment of the rear pinion mount.
Figure 32:
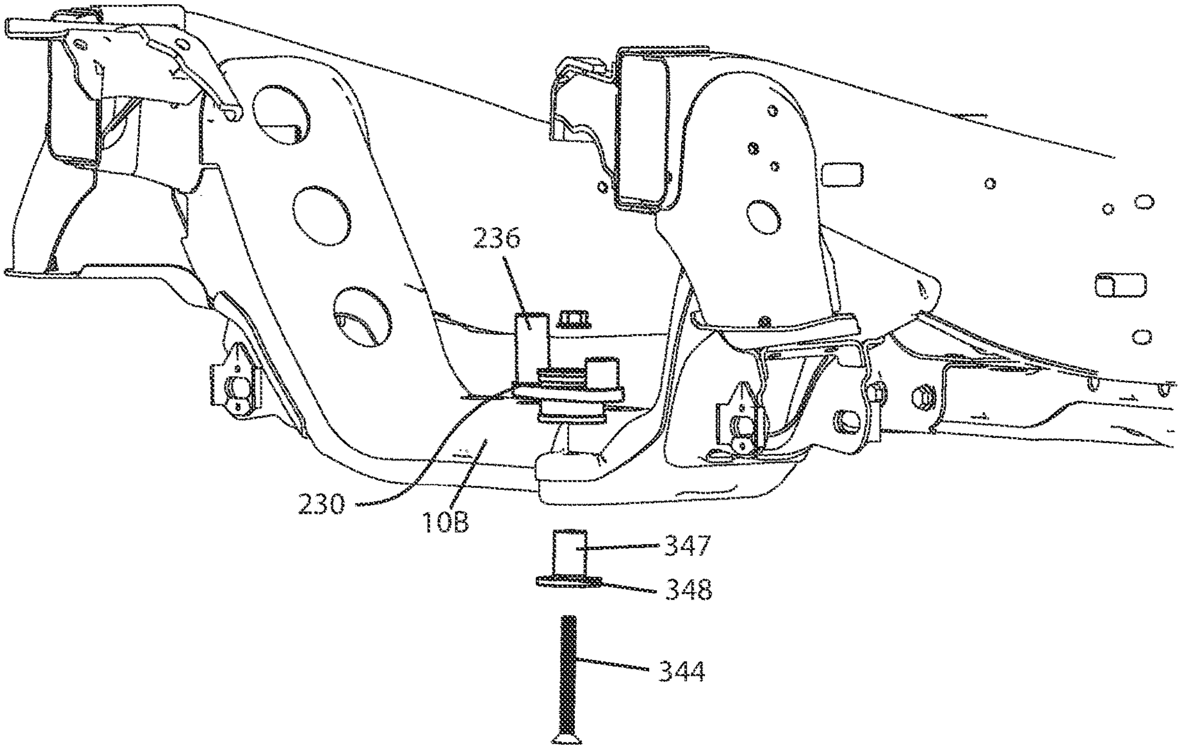
FIG. 32 is an exploded view of the embodiment of the rear pinion mount of FIG. 31 showing a method of attachment to a vehicle frame.
Figure 33:
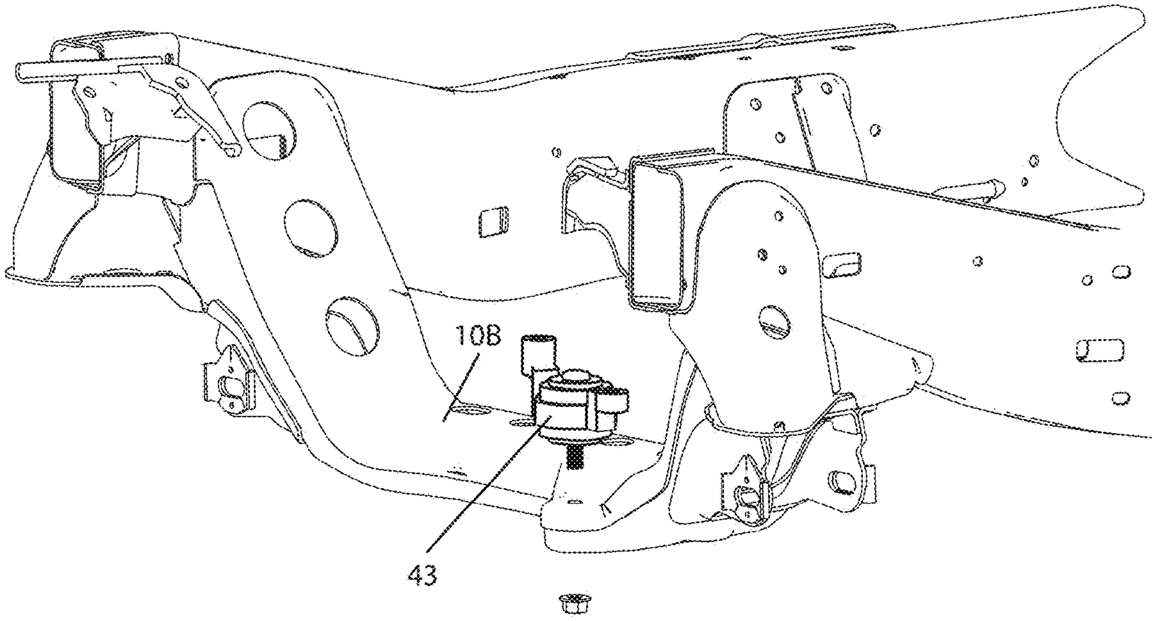
FIG. 33 (Prior Art)
FIG. 33 is a side environmental view of a prior art pinion mount attached to vehicle frame.
Figure 34:
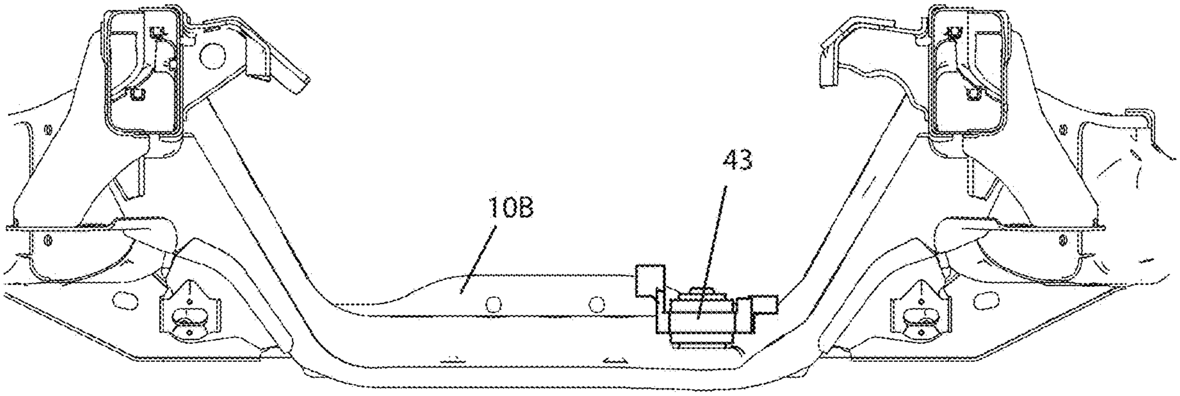
FIG. 34 (Prior Art)
FIG. 34 is a front environmental view of the pinion mount of FIG. 33.
Figure 35:
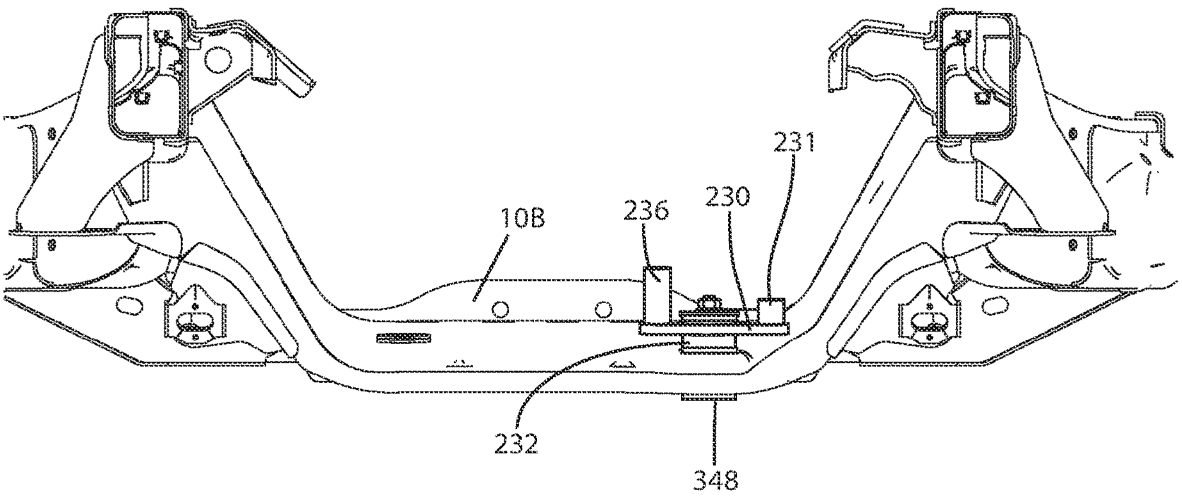
FIG. 35 is a front environmental view of a vehicle chassis having an embodiment of a pinion mount of the present invention attached thereto.

In alternative embodiments, a stronger pinion mount and skid plate are provided. As shown in FIG. 31, it is seen that embodiments of the pinion mount 230 may include a reinforcing bracket 347 having an outwardly extending flange 348 that may be provided for engagement with bushing 150 using an elongated bolt 344. This embodiment of the pinion mount provides a strengthened connection to the frame 10B. A corresponding opening 409 may be provided in an embodiment of skid plate 401 to allow the wider flange 348 of this reinforcing bracket 347 to pass through. Although the embodiment of flange 348 illustrated in FIG. 31 is circular, it is to be appreciated that this flange may have any suitable shape including without limitation oval, square, hexagonal, octagonal or another shape, and that opening 409 may have a corresponding shape. It is to be appreciated that once installed, bracket 347 and flange 348 are designed to be flush with skid plate 401 so as not to interfere with clearance below.

Figure 25:
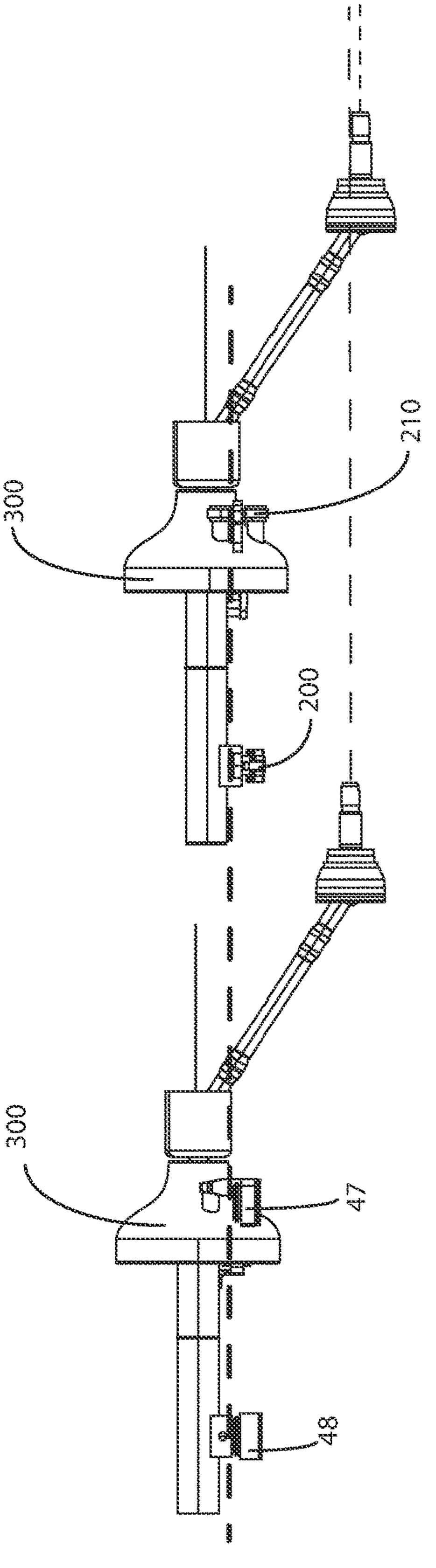
FIG. 25 are front views showing a side by side comparison of a differential mounted using after-market parts (left side), and a differential mounted using an embodiment of the present invention (right side), illustrating the offset achieved.
Figure 26:
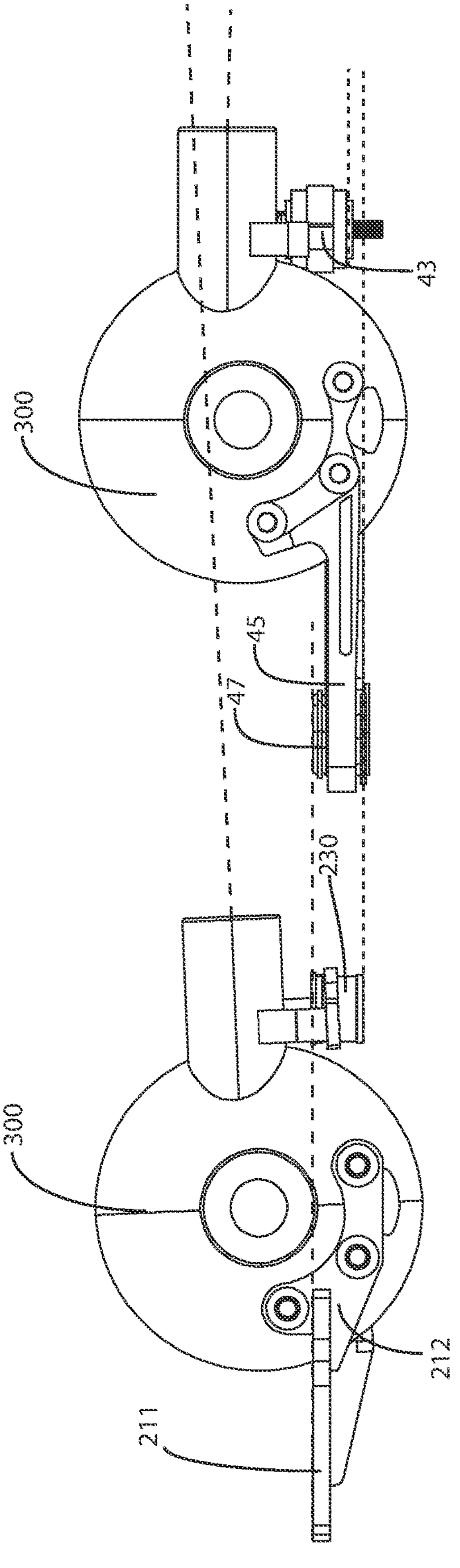
FIG. 26 are side views showing a side by side comparison of a differential mounted using after-market parts (right side) and a differential mounted using an embodiment of the present invention (left side) illustrating the different angles of the pinion output shaft and the mounting component alignment differences.

Referring to FIG. 25, it is seen that a front view of a differential mounted using after-market parts is shown on the left, and a differential mounted using an embodiment of the present invention is shown on the right, illustrating the difference in offset achieved. Referring to FIG. 26, it is seen that a side view of a differential mounted using after-market parts is shown on the right, and a differential mounted using an embodiment of the present invention is shown on the left, illustrating the different angles of the pinion output shaft as well as mounting component alignment differences.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. An apparatus for increasing clearance below a vehicle comprising:

a. a driver side differential support arm comprising a first section for engagement with a front cross member of a vehicle chassis without a bushing therebetween, and a second section that is generally perpendicular to said first section for engagement with a differential of said vehicle;

b. a passenger side differential support arm comprising a first end for engagement with said front cross member of said vehicle chassis without a bushing therebetween, and an opposite end for engagement with said differential of said vehicle; and c. a rear pinion mount for engagement between said differential and a rear cross member of said vehicle chassis, wherein installation of said driver side differential support arm, passenger side differential support arm, and rear pinion mount increases a forward vertical clearance of the vehicle.

2. The apparatus of claim 1 wherein said driver side differential support arm and said passenger side differential support arm are operable to replace corresponding factory components and position said differential in a forward and lower position such that drivetrain components of the vehicle are realigned to factory positions while providing the vehicle with increased forward clearance.

3. The apparatus of claim 1 wherein the second section of said driver side differential support arm further comprises a plurality of mounting holes with bushings therein for mounting to factory mounting locations of the differential; and the opposite end of said passenger side differential support arm further comprises a plurality of mounting holes with bushings therein for mounting to factory mounting locations of the differential.

4. The apparatus of claim 1 wherein the first and opposite ends of said passenger side differential support arm are offset from each other in parallel planes, and are separated by an angled connecting bracket.

5. The apparatus of claim 1 further comprising a skid plate extending from said rear cross member, below said passenger side differential support arm and said driver side differential support arm, to a further front cross member for protecting said passenger side differential support arm and said driver side differential support arm and said rear pinion mount.

6. The apparatus of claim 5 wherein said skid plate includes an opening therein for receiving a lower portion of said differential.

7. The apparatus of claim 6 wherein said skid plate includes a second opening therein for receiving a fastener of said rear pinion mount.

8. The apparatus of claim 5 wherein said rear pinion mount is mounted on top of said rear cross member using a fastener extending upward from below and through said rear cross member, and said skid plate includes an opening therein for receiving said fastener.

9. The apparatus of claim 8 wherein said fastener includes a reinforcing bracket having an outwardly extending flange, and said opening in said skid plate is sized to receive said flange.

10. An apparatus for mounting a front differential to pre-existing fastening locations of a chassis of a vehicle comprising:

a. a first side arm comprising a first frame bracket and a first differential bracket separated by an elongated arm, wherein said first frame bracket mounts to a bottom of a front cross member of said chassis, and said first differential bracket has a plurality of mounting holes with bushings therein for mounting to factory mounting locations of the front differential;

b. a second side arm comprising a second frame bracket at one end having at least one hole thereon for mounting to at least one factory mounting location on said front cross member of said chassis, and a second differential bracket having a plurality of mounting holes thereon having bushings therein for engaging with factory mounting locations of the front differential; and c. a rear pinion mount that is operable to secure said front differential to a rear cross member;

wherein said first side arm and said second side arm are operable to replace corresponding factory components in order to position said front differential in a forward and lower position such that drivetrain components of the vehicle are realigned to factory positions while providing the vehicle with increased forward clearance.

11. The apparatus of claim 10, wherein said elongated arm separates said first frame bracket and said first differential bracket such that said first frame bracket and said first differential bracket are offset from each other and are on different parallel planes.

12. The apparatus of claim 10, wherein said second differential bracket engages with factory mounting locations of said front differential and is perpendicular to said second frame bracket.

13. The apparatus of claim 10, wherein the first and second frame brackets of said first and second side arms, respectively, are attached to said front cross member without a bushing to increase clearance under the front cross member at respective frame bracket mounting locations.

14. The apparatus of claim 10, further comprising a skid plate attached to a further front cross member and said rear cross member to shield an underside of said vehicle.

15. The apparatus of claim 10, wherein said elongated arm attaches to said first frame bracket and said first differential bracket at an angle ranging from about 10° to about 17.5° and said first frame bracket and said first differential bracket are offset by a distance ranging from about ½ inch to about 2 inches.

16. The apparatus of claim 10, wherein each of said bushings comprises an assembly comprising two symmetrical sleeve bushings and a compression sleeve.

17. The apparatus of claim 10, wherein said second frame bracket is weldably attached to said second differential bracket.

18. The apparatus of claim 10, wherein said first side arm is positioned on a passenger side of the front differential and said second side arm is positioned on a driver side thereof.

19. The apparatus of claim 10, wherein said second frame bracket has a slot operable to align said second differential bracket perpendicular to said second frame bracket.

20. The apparatus of claim 10, wherein said rear pinion mount replaces a corresponding factory rear pinion mount.

* * * * *